(12) United States Patent
Chen et al.

(10) Patent No.: US 7,849,655 B2
(45) Date of Patent: Dec. 14, 2010

(54) CONNECTING SYSTEM FOR SURFACE COVERINGS

(75) Inventors: Hao A. Chen, Chaddsford, PA (US); John Whispell, Woodstown, NJ (US)

(73) Assignee: Mannington Mills, Inc., Salem, NJ (US)

( * ) Notice: Subject to any disclaimer, the term of this patent is extended or adjusted under 35 U.S.C. 154(b) by 1477 days.

(21) Appl. No.: 11/190,452

(22) Filed: Jul. 27, 2005

(65) Prior Publication Data
US 2007/0022694 A1 Feb. 1, 2007

(51) Int. Cl.
*E04B 5/00* (2006.01)
(52) U.S. Cl. .................. 52/592.1; 52/588.1; 52/591.4; 52/747.1; 52/177
(58) Field of Classification Search .................. 52/177, 52/483.1, 539, 588.1, 589.1, 591.1, 592.1, 52/592.4, 843, 844, 747.1, 591.4, FOR. 142, 52/FOR. 143, 590.2
See application file for complete search history.

(56) References Cited

U.S. PATENT DOCUMENTS

| | | | |
|---|---|---|---|
| 1,764,331 A | 6/1930 | Moratz | |
| 1,838,591 A | 6/1931 | Bruce | |
| 2,004,193 A | 6/1935 | Cherry | |
| 2,152,694 A | 4/1939 | Hoover | |
| 2,852,815 A | 9/1958 | Sale | |
| 2,882,560 A | 4/1959 | Plendl | |
| 3,200,553 A | 8/1965 | Frashour et al. | |
| 3,301,147 A | 1/1967 | Clayton et al. | |
| 3,385,182 A | 5/1968 | Harvey | |
| 3,385,183 A * | 5/1968 | Kortz | 404/35 |
| 3,437,360 A | 4/1969 | Gould et al. | |
| 3,460,304 A * | 8/1969 | Glaza et al. | 52/588.1 |
| 3,555,762 A * | 1/1971 | Costanzo, Jr. | 52/588.1 |
| 3,572,224 A * | 3/1971 | Perry | 404/40 |

(Continued)

FOREIGN PATENT DOCUMENTS

CH 401 422 10/1965

(Continued)

OTHER PUBLICATIONS

International Search Report and Written Opinion of the International Searching Authority for PCT/US2006/027843 dated Dec. 27, 2006.

(Continued)

*Primary Examiner*—Robert J Canfield
*Assistant Examiner*—Jessie Fonseca
(74) *Attorney, Agent, or Firm*—Kilyk & Bowersox, P.L.L.C.

(57) ABSTRACT

A system and method for joining floor planks includes two or more planks wherein each plank includes a tongue, a groove, and optionally a shoulder, and optionally a protruding lip, that provide a mechanism for connecting two or more planks together. The tongue can be on the opposing side of each plank from the groove. The groove can be defined between a first flange extending along a first edge of the plank and from one side of the plank, and a second flange extending distally beyond a distal edge of the first flange from the first edge of the plank and from a second side of the plank opposite from the first side. The tongue can be S-shaped to form an interlocking relationship with the groove.

57 Claims, 13 Drawing Sheets

U.S. PATENT DOCUMENTS

| | | | |
|---|---|---|---|
| 3,623,288 | A | 11/1971 | Horowitz |
| 3,731,445 | A | 5/1973 | Hoffmann et al. |
| 4,095,913 | A | 6/1978 | Pettersson et al. |
| 4,242,390 | A | 12/1980 | Nemeth |
| 4,426,820 | A | 1/1984 | Terbrack et al. |
| 4,471,012 | A | 9/1984 | Maxwell |
| 4,695,502 | A | 9/1987 | Rush |
| 4,703,597 | A * | 11/1987 | Eggemar .................. 52/220.2 |
| 4,758,128 | A * | 7/1988 | Law ......................... 414/477 |
| 4,807,416 | A | 2/1989 | Parasin |
| 4,951,992 | A | 8/1990 | Hockney |
| 4,953,335 | A | 9/1990 | Kawaguchi et al. |
| 5,283,102 | A | 2/1994 | Sweet et al. |
| 5,295,341 | A | 3/1994 | Kajiwara |
| 5,348,778 | A | 9/1994 | Knipp et al. |
| 5,437,934 | A | 8/1995 | Witt et al. |
| 5,618,602 | A | 4/1997 | Nelson |
| 5,694,730 | A | 12/1997 | Del Rincon et al. |
| 5,706,621 | A | 1/1998 | Pervan |
| 5,736,227 | A | 4/1998 | Sweet et al. |
| 5,782,044 | A * | 7/1998 | Dodd et al. ................. 345/629 |
| 5,797,237 | A | 8/1998 | Finkell, Jr. |
| 5,860,267 | A | 1/1999 | Pervan |
| 6,006,486 | A | 12/1999 | Moriau et al. |
| 6,023,907 | A | 2/2000 | Pervan |
| 6,094,882 | A | 8/2000 | Pervan |
| 6,098,362 | A | 8/2000 | Marriott et al. |
| 6,101,778 | A | 8/2000 | Martensson |
| 6,182,410 | B1 | 2/2001 | Pervan |
| 6,199,340 | B1 * | 3/2001 | Davis ......................... 52/592.1 |
| 6,205,639 | B1 | 3/2001 | Pervan |
| 6,226,950 | B1 | 5/2001 | Davis |
| 6,510,665 | B2 | 1/2003 | Pervan |
| 6,591,567 | B2 * | 7/2003 | Hota et al. .................... 52/578 |
| 6,617,009 | B1 | 9/2003 | Chen et al. |
| 6,675,545 | B2 | 1/2004 | Chen et al. |
| 6,715,253 | B2 | 4/2004 | Pervan |
| 6,769,218 | B2 | 8/2004 | Pervan |
| 6,769,835 | B2 | 8/2004 | Stridsman |
| 6,772,568 | B2 | 8/2004 | Thiers et al. |
| 6,786,019 | B2 | 9/2004 | Thiers |
| 6,794,001 | B2 | 9/2004 | Chen |
| 6,928,779 | B2 | 8/2005 | Moriau et al. |
| 7,021,012 | B2 * | 4/2006 | Zeng et al. .................... 52/177 |
| 2001/0021431 | A1 | 9/2001 | Chen et al. |
| 2002/0031646 | A1 | 3/2002 | Chen et al. |
| 2002/0092263 | A1 | 7/2002 | Schulte |
| 2003/0033784 | A1 | 2/2003 | Pervan |
| 2003/0094230 | A1 | 5/2003 | Sjoberg |
| 2004/0031225 | A1 | 2/2004 | Fowler |
| 2004/0031226 | A1 | 2/2004 | Miller et al. |
| 2004/0045247 | A1 | 3/2004 | Kim et al. |
| 2004/0049995 | A1 * | 3/2004 | Rogers ........................ 52/177 |
| 2004/0111993 | A1 | 6/2004 | Hollman |
| 2004/0123538 | A1 | 7/2004 | Ko |
| 2004/0128934 | A1 | 7/2004 | Hecht |
| 2005/0108970 | A1 | 5/2005 | Liu |

FOREIGN PATENT DOCUMENTS

| | | |
|---|---|---|
| EP | 0 248 127 | 12/1987 |
| FR | 2 385 858 | 3/1978 |
| FR | 2 459 335 | 1/1981 |
| GB | 1094712 | 12/1967 |
| JP | 81-09734 | 4/1996 |
| WO | WO 96/27719 | 9/1996 |
| WO | WO 2005/021892 A1 | 3/2005 |

OTHER PUBLICATIONS 2 pictures of floor plank profile sample from Belgium flooring company (2004) (1 page).

* cited by examiner

CONNECTING SYSTEM FOR SURFACE COVERINGS

BACKGROUND OF THE INVENTION

The present invention relates to surface-coverings, like flooring, and methods of installing the same.

Various types of glueless mechanical locking systems (tongue and groove arrangements) have been utilized in the flooring industry. Flooring with glueless mechanical locking systems (tongue and groove arrangements) are becoming increasingly popular, as they are easy to lay, and, thus, it is not necessary to utilize highly trained personnel to lay such floor tiles.

However, prior proposed floor systems have suffered from disadvantages. One disadvantage experienced with prior proposed floor systems is that if each of the side edges of a plank includes a tongue or groove, once one of the side edges is connected to another similar plank, it is difficult to connect the other side edges of the plank with another similar plank without lifting portions of the connected flooring to create the necessary angle to connect the plank. This problem particularly accentuates while installing a click system floor at very limited free space confined areas such as any corners of a room, under the door jamb or under closets or kitchen islands and the like, where there is no room for lifting portions of the connected flooring to create the necessary angle to connect the plank. Therefore, some flooring systems have a tongue and groove on the first opposing side edges and a straight edge on the other opposing side edges. However, this type of flooring system also includes certain disadvantages. For example, the straight side edges that are connected to one another may not be water tight and could potentially slide open to form a gap. If an adhesive is used, the adhesive can be pressed out of the seams to create messy seams. Other flooring systems have flexible grooves that have some "give" to permit connecting without angling. However, the integrity of the system is questionable and there is difficulty in making such a joint.

Accordingly, there is a need to provide a connecting system for flooring and other surface-coverings that is relatively inexpensive, provides an excellent connection between the planks, is easy to connect along each of the side edges of the planks, and/or that is moisture resistant and provides an overall acceptable bond strength between two joined planks.

SUMMARY OF THE INVENTION

A feature of the present invention is to provide a panel or a plank comprising a groove defined, at least partially, by a first flange protruding from a first side of the plank along a first edge of the plank, and a second opposing flange protruding from a second, opposite side of the plank along the first edge. The first flange protruding from the first side of the plank can terminate at a distal first flange edge, and the second flange protruding from the second side of the plank can extend distally beyond the distal first flange edge and curve or angle toward the distal first flange edge to define an opening into the groove that is accessible at an angle from the first side of the plank. A cantilevered tongue can be provided protruding from a second side of the plank opposite from the first side and extending along a second edge of the same plank. The cantilevered tongue can be provided with a S-shaped configuration so that a distal edge of the cantilevered tongue is offset from the second side of the plank. The groove can be configured to receive the tongue in a first relative orientation of two similarly configured planks as the two planks are moved toward each other in a direction substantially perpendicular to the first and second edges of the planks. The opening into the groove can allow receipt of the cantilevered tongue with a S-shaped configuration as the two planks are positioned in the first relative orientation, wherein one of the planks is angled relative to the other plank with respect to their first and second sides. After entry of the S-shaped cantilevered tongue into the groove, rotation of the two planks relative to each other and with respect to their first and second sides can mechanically lock the tongue in place relative to the groove in a second relative orientation of the planks, wherein the first and second sides of the planks are substantially coplanar or flush. Each plank can also comprise a shoulder extending along a third edge of the plank and formed by a recess in one of the first or second sides of the plank along the third edge of the plank. A protruding lip can be provided extending along a fourth edge of each plank opposite from the third edge, formed by a recess in the other of the first or second sides of the plank, and designed to mate with the shoulder on a similarly configured plank such that the first sides of the mating planks will be substantially coplanar or flush with each other, and the second sides of the mating planks will be substantially coplanar or flush with each other. The third edge and the fourth edge of the plank can be a straight edge such that the edges of two mating planks can be butted together to be substantially coplanar or flush with each other. A chemical welding agent such as THF can then be applied on the butted joint to melt the plastic together (when the planks are thermoplastic) at the contact to provide excellent joint integrity in strength and water-sealability. Other joining materials can be used, like adhesives, especially when the plank is made from laminates like fiberboard, e.g., HDF or MDF.

Another feature of the present invention is to provide a connecting system for flooring planks and other surface-coverings that do not require any connecting accessories such as an insert or spline or metal clip, and the like, and permits easy and fast installation and flexibility.

Still another feature of the present invention is to provide a surface-covering system that has significant improvements with respect to ease of installation at confined areas, and includes a foolproof installation design and technique.

Another feature of the present invention is to provide a plank that can be easily connected to other planks.

Another feature of the present invention is to provide a surface-covering system which can avoid the use of the application of a wet adhesive composition.

Another feature of the present invention is to provide a flooring system that has great flexibility so as to make various shapes and sizes.

Also, a feature of the present invention is to provide a surface-covering system that has the ability to tolerate some imperfections in the sub-floor or substrate and, thus, avoids telegraphing the imperfections on the surface-covering itself.

Another feature of the present invention is to provide cushioned feet on the back of the planks that can totally alleviate the requirement of using under-padding for comfort footing and sound deadening purposes.

Also, a feature of the present invention is to provide a surface-covering system that has the ability to withstand water damage, such as swelling, delamination, weakening strength, and can withstand heavy traffic wear and tearing and gouging, and has stain and chemical resistance and ease of maintenance.

Also, a feature of the present invention is to join the joints together to maximize the ease of installation.

Another feature of the present invention is to provide a joint system that combines mechanical locking and chemical welding to maximize the joint strength, ease of installation, and water sealability.

Also, a feature of the present invention is to develop a joining system that allows either tongue to receive groove or groove to receive the tongue for ease of installation.

Additional features and advantages of the present invention will be set forth in the description which follows, and, in part, will be apparent from the description, or may be learned by practice of the present invention. The features and other advantages of the present invention will be realized and attained by means of the elements and combinations particularly pointed out in the written description and the claims.

To achieve these and other advantages, and in accordance with the purposes of the present invention as embodied and broadly described herein, the present invention, in one embodiment, relates to structural features of planks along interconnecting edges and/or surfaces of the planks that can comprise a tongue along an edge of a first plank and a mating groove along an edge of an interconnecting second plank, and a shoulder along another edge of the first plank and overlapping lip along an edge of a third interconnecting plank. Each of the interconnecting planks can be interchangeable, so the groove can be defined, at least partially, by a first flange protruding from a first side of a plank along a first edge of the plank and a second opposing flange protruding from a second, opposite side of the plank along the first edge. Additionally, the tongue can be formed to protrude in a cantilever fashion from a second side of the plank opposite from the first side and extending along a second edge of the same plank. The shoulder extending along a third edge of the plank can be configured to mate with a protruding lip extending along the fourth edge of a similarly configured plank. The protruding lip can extend away from the edge of the plank for a distance that, at least substantially, covers the shoulder of another similarly configured plank. The protruding lip, generally, equals the dimensions of the shoulder portion such that the two portions mate with each other when two planks are adjoined.

The present teachings further relate to a plurality of planks connected together along one side edge by the tongue and groove features, and along another side edge by the shoulder and overlapping lip features. The overlapping lip features cover or substantially cover the shoulder features on the interconnected planks.

The present teachings also relate to a method to connect two or more planks together. The method of connecting can involve inserting a tongue located along one side edge of a plank into a groove located along one side edge of a second plank. Furthermore, the method can also comprise interconnecting the planks such that the protruding lip along an edge of a first plank, at least substantially, overlaps the shoulder along an edge of a second plank. Optionally, a chemical welding agent or other material, like adhesives, can be applied at the joint to improve the integrity and the strength of the joint.

The present invention further relates to various panel or plank designs, such as mechanical locking tongue and groove designs, including, but not limited to, a panel comprising:
 a groove extending along a first edge of the panel;
 a tongue extending along a second edge of the panel, wherein the tongue is on an opposing side of the first edge of the panel having the groove;
 wherein the groove is defined between a first flange extending along the first edge of the panel and protruding from a first side of the panel, and a second flange extending along the first edge of the panel and protruding from a second side of the panel opposite to the first side,
 wherein the first flange terminates in a distal first flange edge, and the second flange extends distally beyond the distal first flange edge and curves or angles in a direction toward the horizontal plane of the first side, the groove being defined between the first and second flanges and opening along the groove at an angle toward the first side of the panel,
 wherein the tongue is configured in a S-shape and a distance from the panel to the distal edge of the tongue is a function of a distance from the panel to the distal first flange edge.

The present invention also relates to a plank or panel comprising:
 a groove extending along a first edge of the panel;
 a tongue extending along a second edge of the panel, wherein the tongue is on an opposing side of the first edge of the panel having the groove;
 wherein the tongue has a bottom surface and the panel has a top surface, and wherein the tongue has an overall height as measured from the bottom surface of the tongue to the top surface of the panel, and wherein the overall height of the tongue is at least 50% of the overall height of the panel. The groove can be defined between a first flange extending along the first edge of the panel and protruding from a first side of the panel, and a second flange extending along the first edge of the panel and protruding from a second side of the panel opposite to the first side. The first flange can terminate in a distal first flange edge, and the second flange can extend distally beyond the distal first flange edge and curves or angles in a direction toward the horizontal plane of the first side. The groove can be defined between the first and second flanges and opening along the groove at an angle toward the first side of the panel.

In addition, the present invention relates to a plank or panel comprising:
 a groove extending along a first edge of the panel;
 a tongue extending along a second edge of the panel, wherein the tongue is on an opposing side of the first edge of the panel having the groove;
 wherein the groove is defined between a first flange extending along the first edge of the panel and protruding from a first side of the panel, and a second flange extending along the first edge of the panel and protruding from a second side of the panel opposite to the first side,
 wherein the first flange terminates in a distal first flange edge, and the second flange extends distally beyond the distal first flange edge and curves or angles in a direction toward the horizontal plane of the first side, the groove being defined between the first and second flanges and opening along the groove at an angle toward the first side of the panel,
 wherein the panel has a top surface and a bottom surface, wherein the first side of the panel is the top surface and the second side of the panel is the bottom surface, wherein the second flange has a highest point and has a height as measured from the bottom surface of the panel to the highest point in the second flange, and wherein the panel has an overall height, and wherein the height of the second flange is over 50% of the overall height of the panel.

The present invention also relates to a plank or panel comprising:
 a groove extending along a first edge of the panel;

a tongue extending along a second edge of the panel, wherein the tongue is on an opposing side of the first edge of the panel having the groove;

wherein the groove is defined between a first flange extending along the first edge of the panel and protruding from a first side of the panel, and a second flange extending along the first edge of the panel and protruding from a second side of the panel opposite to the first side, wherein the first flange terminates in a distal first flange edge, and the second flange extends distally beyond the distal first flange edge and curves or angles in a direction toward the horizontal plane of the first side, the groove being defined between the first and second flanges and opening along the groove at an angle toward the first side of the panel, wherein the panel has a top surface and a bottom surface, wherein the first side of the panel is the top surface and the second side of the panel is the bottom surface, wherein the second flange has a highest point and has a height as measured from the bottom surface of the panel to the highest point in the second flange, and wherein the first flange has a bottom surface, which has a height measured from the bottom surface of the panel to the bottom surface of the first flange, and wherein the height of the second flange is greater than the height of the bottom surface of the first flange.

Also, the present invention relates to a plank or panel comprising:

a groove extending along a first edge of the panel;
a tongue extending along a second edge of the panel, wherein the tongue is on an opposing side of the first edge of the panel having the groove;

wherein the tongue has a tongue profile shape and the groove has an outlined groove profile shape and wherein the tongue profile shape and the outlined groove profile shape are not identical or substantially identical to each other.

The present invention also relates to a plank or panel comprising:

a groove extending along a first edge of the panel;
a tongue extending along a second edge of the panel, wherein the tongue is on an opposing side of the first edge of the panel having the groove;

wherein the panel has a bottom surface and the tongue is shaped such that a gap exists behind the tongue and the tongue has a bottom surface and the gap has an upper surface, wherein the gap has a gap height as measured from the bottom surface of the tongue to the upper surface of the gap and the panel has a panel height measured from the bottom surface of the panel to the upper surface of the gap, wherein the gap height is at least 10% of the panel height.

The present invention further relates to a plank or panel comprising:

a groove extending along a first edge of the panel;
a tongue extending along a second edge of the panel, wherein the tongue is on an opposing side of the first edge of the panel having the groove;

wherein the groove is defined between a first flange extending along the first edge of the panel and protruding from a first side of the panel, and a second flange extending along the first edge of the panel and protruding from a second side of the panel opposite to the first side, wherein the first flange terminates in a distal first flange edge, and the second flange extends distally beyond the distal first flange edge and curves or angles in a direction toward the horizontal plane of the first side, the groove being defined between the first and second flanges and opening along the groove at an angle toward the first side of the panel, wherein the second flange has an outer angle and an inner angle that defines an angled portion of the second flange, wherein the outer angle can be from about 40° to about 80° as measured from the horizontal plane of the bottom surface of the panel to the angled portion of the second flange.

Further, the present invention relates to a first plank or first panel comprising:

a groove extending along a first edge of the first panel;
a tongue extending along a second edge of the first panel, wherein the tongue is on an opposing side of the first edge of the first panel having the groove;

wherein the groove has a groove profile and the tongue has a tongue profile such that the tongue and groove are capable of connecting with a second panel having the groove profile and the tongue profile, wherein the groove of the first panel is insertable into the tongue of the second panel while the second panel is lying flat on a surface to form a mechanical lock, and the tongue of the first panel is insertable into the groove of the second panel while the second panel is lying flat on a surface to form a mechanical lock.

The present invention also relates to a plank or panel comprising:

a groove extending along a first edge of the panel;
a tongue extending along a second edge of the panel, wherein the tongue is on an opposing side of the first edge of the panel having the groove;

wherein the groove is defined between a first flange extending along the first edge of the panel and protruding from a first side of the panel, and a second flange extending along the first edge of the panel and protruding from a second side of the panel opposite to the first side.

wherein the first flange terminates in a distal first flange edge, and the second flange extends distally beyond the distal first flange edge and curves or angles in a direction toward the horizontal plane of the first side, the groove being defined between the first and second flanges and opening along the groove at an angle toward the first side of the panel, wherein when the panel is connected with a second panel having the same groove and tongue to form a mechanical lock, the void volume created above the second flange is at least 3.5 mm$^2$ multiplied by L, which is the length (in mm) of the tongue or groove along the panel.

It is to be understood that both the foregoing general description and the following detailed description are exemplary and explanatory only and are intended to provide further explanation of the present invention, as claimed.

The accompanying drawings, which are incorporated in and constitute a part of this application, illustrate several embodiments of the present invention and, together with the description, serve to explain the principles of the present invention.

DETAILED DESCRIPTION OF THE PRESENT INVENTION

Figure 1:
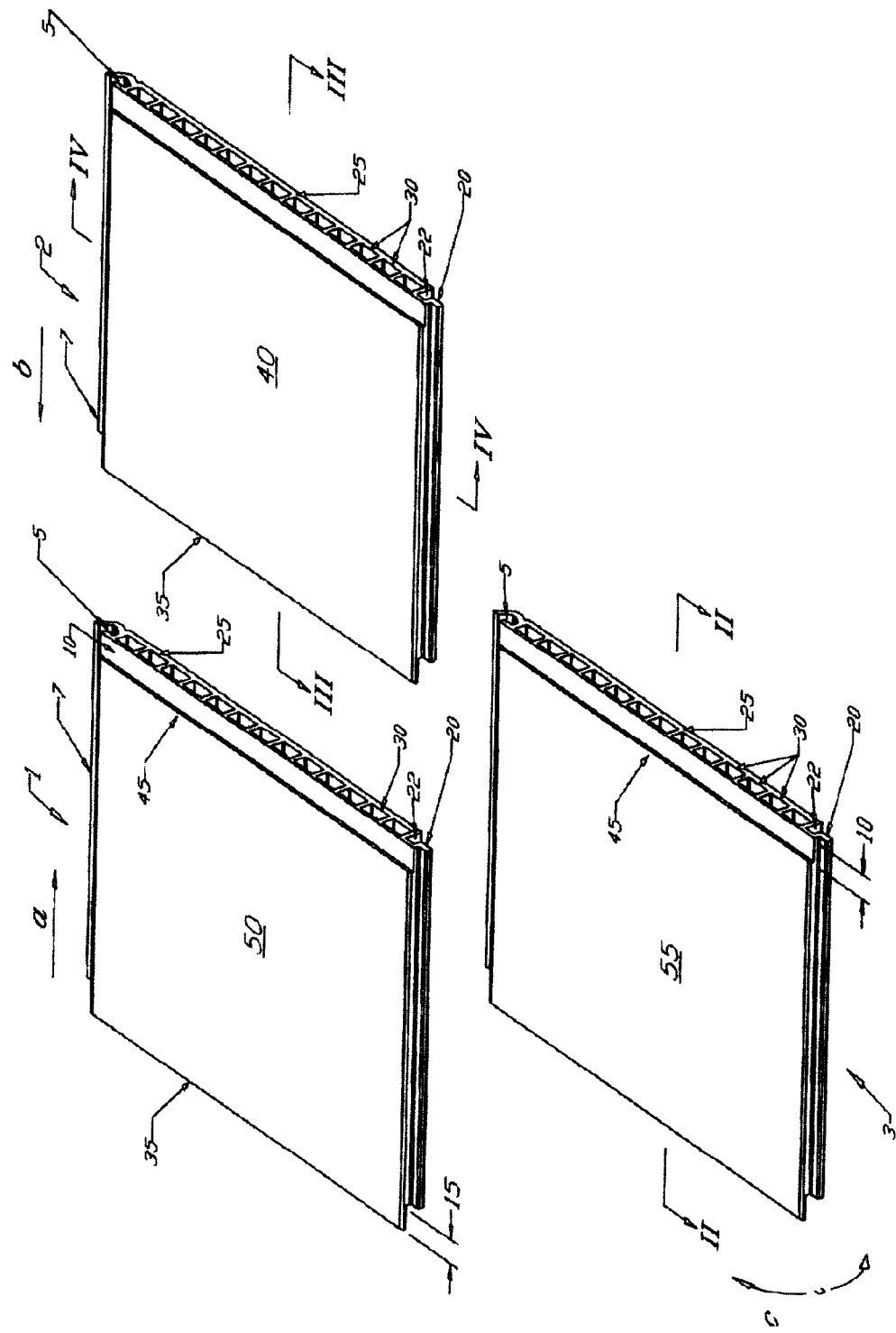
FIG. 1 represents the connection system according to the present invention.

In general, the present invention relates to a surface covering system having a plank or a panel that includes a tongue along an edge of the plank and a mating groove along an edge opposite to the tongue. The plank can have a variety of designs on the other edges of the plank. For instance, the plank can include a shoulder along a third edge of the plank and a protruding lip extending along the fourth edge of the panel opposite from the third edge. The shoulder along one edge of one panel can be adapted to receive the protruding lip along an edge of a similar panel. A feature in one or more embodiments is to provide a panel or a plank comprising a groove defined, at least partially, by a first flange protruding from a first side of the plank along a first edge of the plank, and a second opposing flange protruding from a second, opposite side of the plank along the first edge. The first flange protruding from the first side of the plank can terminate at a distal first flange edge, and the second flange protruding from the second side of the plank can extend distally beyond the distal first flange edge and curve or angle toward the distal first flange edge to define an opening into the groove that is accessible at an angle from the first side of the plank. The second flange, as shown in some of the figures, can curve or angle in a direction toward the horizontal plane of the first side.

A cantilevered tongue can be provided protruding from a second side of the plank opposite from the first side and extending along a second edge of the same plank. The cantilevered tongue can be provided with a S-shaped configuration so that a distal edge of the cantilevered tongue is offset from the second side of the plank. The groove can be configured to receive the tongue in a first relative orientation of two similarly configured planks as the two planks are moved toward each other in a direction substantially perpendicular to the first and second edges of the planks. The opening into the groove can allow receipt of the cantilevered tongue with a S-shaped configuration as the two planks are positioned in the first relative orientation, wherein one of the planks is angled relative to the other plank with respect to their first and second sides.

After entry of the S-shaped cantilevered tongue into the groove, rotation of the two planks relative to each other and with respect to their first and second sides can mechanically lock the tongue in place relative to the groove in a second relative orientation of the planks, wherein the first and second sides of the planks are substantially coplanar or flush. Each plank can optionally also comprise a shoulder extending along a third edge of the plank and formed by a recess in one of the first or second sides of the plank along the third edge of the plank. A protruding lip can be provided extending along a fourth edge of each plank opposite from the third edge, formed by a recess in the other of the first or second sides of the plank, and designed to mate with the shoulder on a similarly configured plank such that the first sides of the mating planks are substantially coplanar or flush with each other, and the second sides of the mating planks are substantially coplanar or flush with each other.

The surface-covering products of the present invention can comprise panels having the structural characteristics discussed above; including at least one side edge that includes a groove to receive the tongue of another surface-covering, at least one side edge that includes a shoulder to receive a protruding lip of another surface-covering, at least one side edge that includes a tongue to mate with the groove of another surface-covering, and at least one side edge that includes a protruding lip to overlap the shoulder along an edge of another surface-covering. The second surface-covering product can include the same characteristics as the first surface-covering.

In the present invention, any dimensions given for various structural features are for illustrative purposes only, and are in no way intended to limit the scope of the present invention.

The plank of the present invention, when polymeric or otherwise extrudable, can be extruded so that it includes a shoulder or recess along at least one of its edges at one side or the opposite side of the plank. Other techniques can be used to create a shoulder along at least one of the edges of the plank. One optional technique to create the shoulder of the present invention would be to emboss or cut at least one edge of the plank to form a shoulder. Another optional technique would be to first make a plank by any known method, and then to shave off or otherwise remove a predetermined amount of the second side of the plank material from the third edge to create a shoulder. Another optional technique would be to add a layer on the second side of the core that does not reach the third edge of the plank; thereby, creating an area that can be depressed relative to the layer added on the second side. In this optional technique, the added layer can be made from the same or different material as the core of the plank.

The plank of the present invention can be embossed or cut in a manner to create the protruding lip on the fourth edge, opposite to the side edge (third edge) having the shoulder. Other techniques can be used to create the protruding lip of the present invention. One optional technique to create the protruding lip of the present invention would be to cut away or otherwise remove a predetermined amount of the underlying core of the plank at the fourth edge so that at the fourth edge of the plank, the second side is further extended than the first side of the plank. Another optional technique would be to add a layer on the second side of the plank, wherein the layer, at the fourth edge can extend beyond the fourth edge of the plank. Therefore, the added layer to the second side of the plank along the fourth edge can cantilever over the first side of the plank along the fourth edge of the plank to form a protruding lip. In one example, the added layer on the second side does not reach the third edge of the second side. Therefore, the added layer also forms a shoulder at the third edge of the second surface of the plank. The added layer can be made from the same or different material as the core of the plank.

The protruding lip along the fourth edge of the plank can mate with a shoulder on the third edge of a similarly configured plank by overlapping or substantially overlapping the protruding lip over the shoulder. In one example, the protruding lip extending along the fourth edge of the plank is designed to mate with a shoulder on a similarly configured plank such that the first and second sides of the planks are flushed or substantially flushed with each other. The protruding lip can have a shape and dimension such that it completely or substantially covers the shoulder of a similarly configured plank. As stated earlier, the first and second edge of the plank can include a groove and tongue, respectively. The plank can be extruded, or otherwise formed, in a manner to include a tongue on the second edge of the plank and a groove on the first edge of the plank of the present teachings. The tongue, which can be on the second edge, preferably, is on the opposing side edge of the plank having the groove which is on the first edge of the plank. Other techniques can also be used to create the tongue and groove of the present teachings. One optional technique to create the tongue and groove is to mill, cut, or mold a tongue on the second edge of the plank and a groove on the opposing first side edge of the plank. Other known techniques to one skilled in the art can also be used to provide the tongue and groove of the present teachings.

An exemplary set of planks of one embodiment of the present invention is illustrated in FIG. 1. FIG. 1 illustrates three exemplary planks 1, 2, and 3 and their relation to one another prior to being connected. According to exemplary FIG. 1, plank 1 includes the groove 5 that is, at least partially, defined by the flange 7. According to FIG. 1, flange 7 is protruding from a first side of plank 1 along the first edge of the plank. Additionally, in FIG. 1, the shoulder or recess 10, can extend along a third edge of the plank 1; and the cantilevered tongue 20 can protrude from the second side of the plank 1 opposite from the first side and extending along a second edge of the plank 1 to define the void/space 22. FIG. 1 also illustrates an exemplary protruding lip 15 having the edge 35 and extending along a fourth edge of the planks 1 and 2. Furthermore, according to FIG. 1, the body or core 25 can, optionally, include a plurality of channels 30, or the core can be solid. According to FIG. 1, the second side 50 of plank 1 can include edges 35 and 45. Plank 2, as illustrated in FIG. 1, can include the groove 5 that is, at least partially, defined by the flange 7, the second side 40, the protruding lip 15 having the edge 35, the cantilevered tongue 20 that can define the void/space 22. The body or core 25, according to FIG. 1, can, optionally, include a plurality of channels 30. Plank 3 is substantially identical to plank 1; however, plank 3 identifies the second side 55.

The shoulder extending along the third edge of the plank and formed by a recess in one of the first or second sides, can be from about 0.220 to about 0.260 inch in depth and can be from about 0.094" to about 0.720 inch wide (distance from the third edge to the edge 45, as illustrated in plank 1 of FIG. 1). Furthermore, the thickness of the protruding lip can have any thickness. In one example, the protruding lip has a thickness that is equal or substantially equal to the depth of the shoulder. Thus, the protruding lip can have a thickness of from about 0.020 to about 0.060 inch. Furthermore, the protruding lip can have a length, as indicated in FIG. 1 by indicia 15, that is equal or substantially equal to the width of the shoulder extending along the third edge of the plank. Thus, the protruding lip can have a length of from about 0.125 to about 0.750 inch or greater. The protruding lip may be shaped such that it can fully conceal or at least substantially conceal the shoulder. The protruding lip is designed to mate with the shoulder on a similarly configured plank such that the first and second sides of the mating planks are substantially flush with each other.

Figure 2:
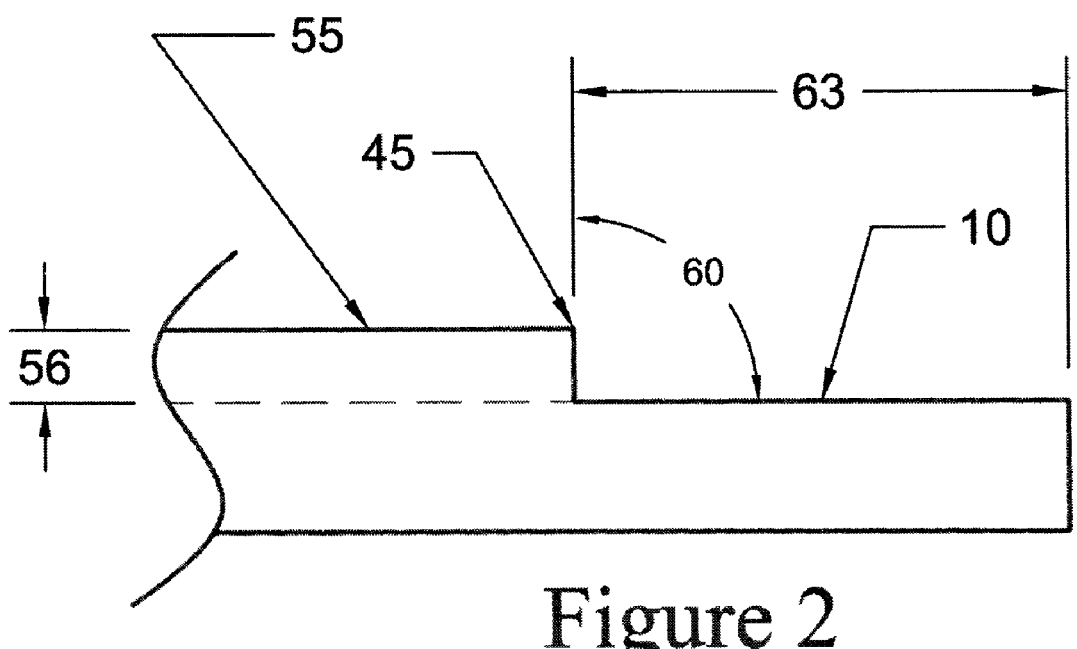
FIG. 2 is a large scale representation of a cross-section according to line II-II in FIG. 1.

FIG. 2, which is a large scale representation of a cross-section according to lines II-II in FIG. 1 is an exemplary embodiment of the shoulder of the p resent teachings. FIG. 2 illustrates an exemplary relationship of the second side 55 and the edge 45 with respect to the shoulder 10. In FIG. 2, the angle 60 is defined by the joint wherein the edge 45 and the shoulder 10 intersect. The angle 60 can have any angle such as, for example, from about 1° to about 180°, such as 90°, as illustrated in the exemplary FIG. 2. Furthermore, the distance from the edge 45 to shoulder 10 can be any distance, such as distance 56, as illustrated in FIG. 2. Additionally, the distance from the base of the edge 45 to the third edge can be any distance, such as, for example, distance 63, as illustrated in the exemplary FIG. 2.

Figure 3:
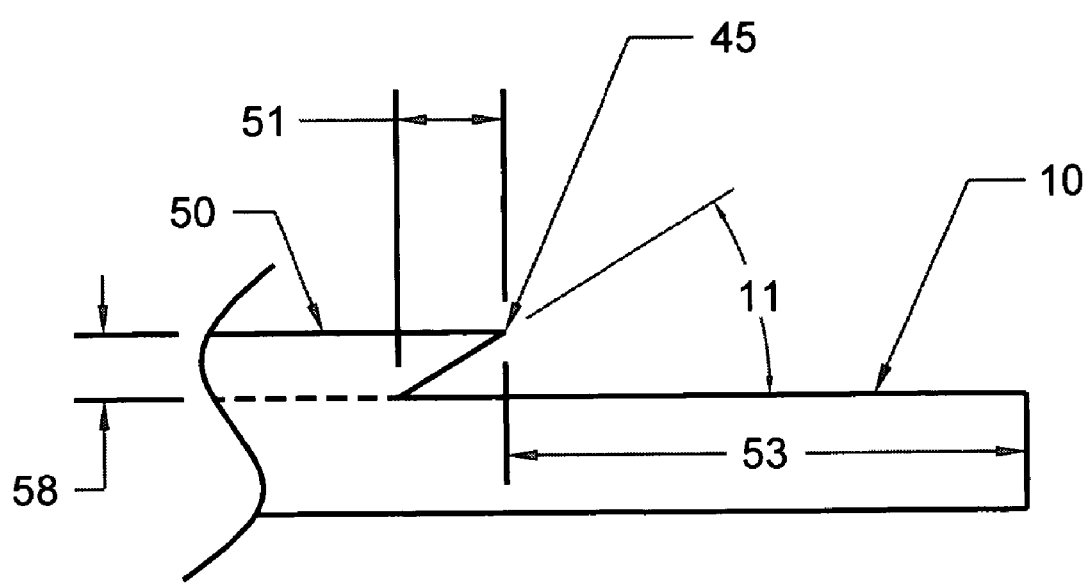
FIG. 3 is an alternative large scale representation of a cross-section according to line II-II in FIG. 1.

In accordance with various embodiments, FIG. 3 is an exemplary alternative large scale representation of cross-section according to lines II-II in FIG. 1. According to FIG. 3, the section of edge 45 that comes into contact with shoulder 10 forms the angle 11. The angle 11 can be in any degree, for example it can be from about 1° or less to about 180°. However, as illustrated in FIG. 3, the angle defined by the contacting point of the edge 45 and shoulder 10 can be an acute angle, such as an angle of from about 1° or less to about 90° to form an undercut. As illustrated in FIG. 3, the formed undercut can have a length 51. Furthermore, this embodiment defines the distance 58, which is the vertical distance from the edge 45 to the shoulder 10.

Figure 4:
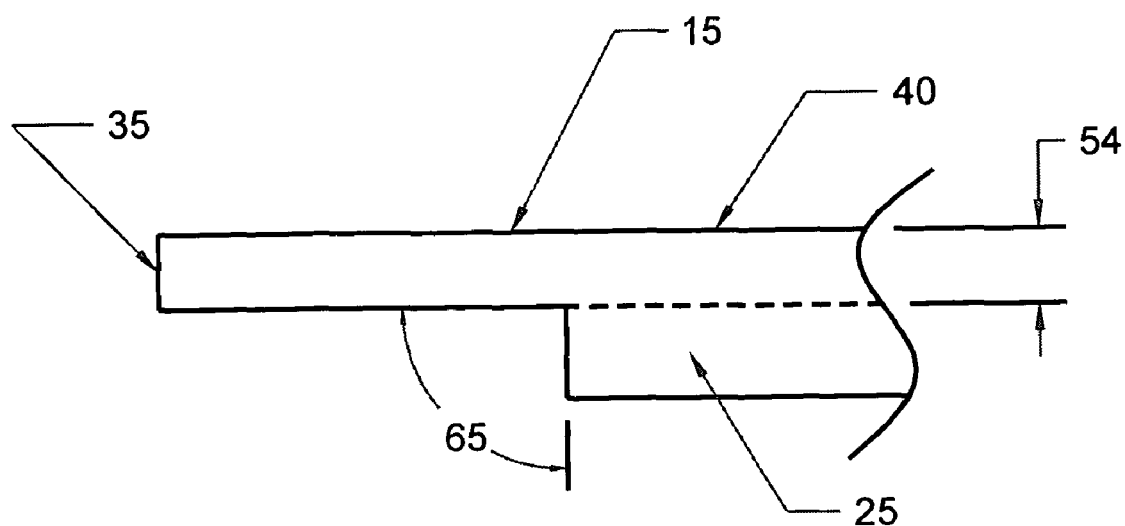
FIG. 4 is a large scale representation of a cross-section according to line III-III in FIG. 1.

The protruding lip extending along the fourth edge of the plank opposite from the third edge can have any shape or configuration to mate with the shoulder on a similarly configured plank. An exemplary configuration of the protruding lip is illustrated in FIG. 4. FIG. 4 is a large scale representation of a cross-section according to lines III-III in FIG. 1. FIG. 4 illustrates the relationship of the second side 40 with respect to the protruding lip 15 having the edge 35. As illustrated in FIG. 4, the joint where the bottom surface of the protruding lip 15 and the core 25 intersect defines the angle 65. In the exemplary FIG. 4, the angle 65 has an angle of about 90°. However, the angle 65 can be other angles greater or less than 90°. Furthermore, the distance from the second side 40 to the point wherein the second side 40 contacts the core 25 can have any length, such as, for example, a length 54, as illustrated in FIG. 4. The length 54 can be equivalent or substantially equivalent to the distance 56, indicated in FIG. 2. In some embodiments, the protruding lip 15 has a length that is the same or is longer than the length of the shoulder 10 from the point where edge 45 comes into contact with the shoulder 10 to the third edge. In this exemplary design, when the protruding lip 15 is placed on the shoulder 10, such that the edge 35 of FIG. 3 is in contact with or, at least substantially in contact with, the edge 45 of FIG. 2, a gap (not shown) or no gap can be created between the third edge of a first plank and the fourth edge of a second plank.

Figure 5:
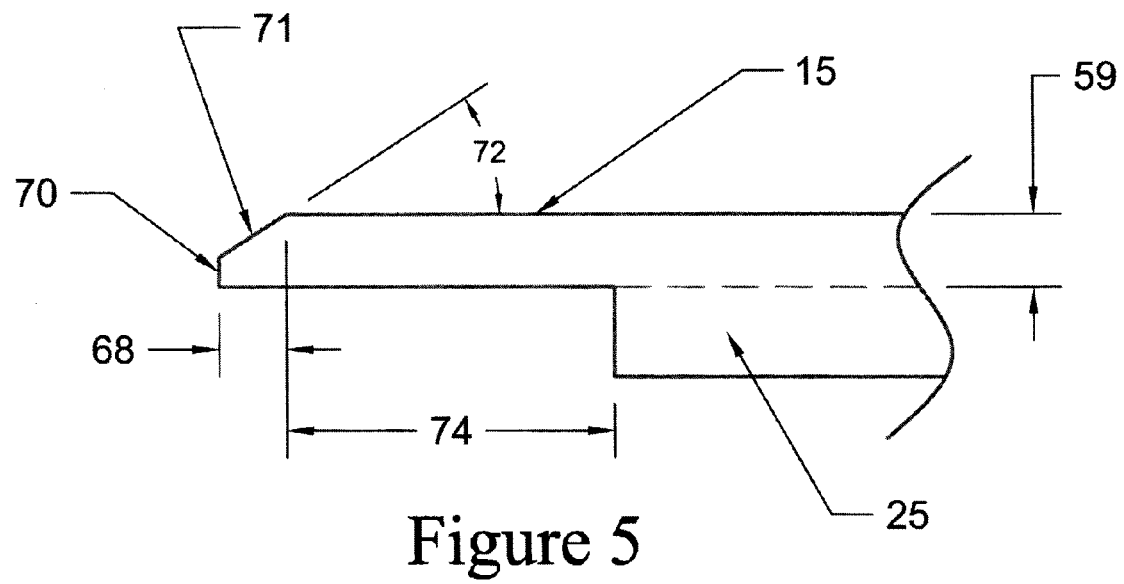
FIG. 5 is an alternative large scale representation of a cross-section according to line III-III in FIG. 1.

As stated above, the protruding lip can have any shape to mate with the shoulder. Thus, when the shoulder has an undercut configuration, as illustrated in FIG. 3, the edge of the protruding lip can have an uppercut that is preferably configured to be inserted into the undercut shoulder. The uppercut of the protruding lip can have an angle that is equal to, substantially equal to, or is larger than the angle of the undercut, for example, the upper cut can have an angle of from about 1° or less to about 180°. Therefore, in some examples, the edge of the uppercut of the protruding lip can also have different angles to fit the undercut, such as being angled (beveled), with a pointed tip, or without (blunt) a pointed tip. For instance, FIG. 5 illustrates an exemplary alternative large scale representation of a cross-section according to lines III-III in FIG. 1. As shown in FIG. 5, the protruding lip 15 can include the beveled ending 71 having the acute angle 72 and the blunt edge 70. The beveled ending 71 of the protruding lip 15 of FIG. 5 can have a length 68, and the protruding lip 15, excluding the beveled ending 71, can have a length 74. Furthermore, the protruding lip 15 can have a height 59, which can be the same or substantially the same as the height 58 of FIG. 3. The length 74 can be the same or longer than the length 53 of FIG. 3. However, the length 68 can be the same or shorter than the length 51 of FIG. 3.

In some exemplary embodiments, the difference between the length 74 and the length 53 can be from about 1 mm to about 5 mm. For example, the length 74 can be from about 5 mm to about 15 mm and the length 53 can be from about 2 mm to about 10 mm. Furthermore, the difference between the length 68 and the length 51 can be from about 0.1 mm to about 1 mm. For example, the length 51 can be from about 0.2 mm to about 1.5 mm and the length 68 can be from about 0.3 mm to about 2 mm. Additionally, the angle 72 can be the same or larger than the angle of the undercut (angle 11 of FIG. 3). The difference between the angle of the undercut and the angle of the beveled protruding lip can be as much as 10° or more. For example, the difference between the two angles can be from about 2° to about 5°. Thus, if the angle of the undercut (the angle 11 of FIG. 3) is about 30°, the angle of the beveled protruding lip (the angle 72 of FIG. 4) can be about 32°.

In accordance with various embodiments, the plank of the present application can have any length or width. For example, the length of the plank, from the edge of the plank having a groove to the opposite edge having a tongue can be less than or greater than the width of the plank from the edge having a shoulder to the opposite edge having a protruding lip. The plank can be manufactured as a solid piece or can be extruded, injection molded, or otherwise formed with interior channels or voids of various dimensions.

Figure 6:
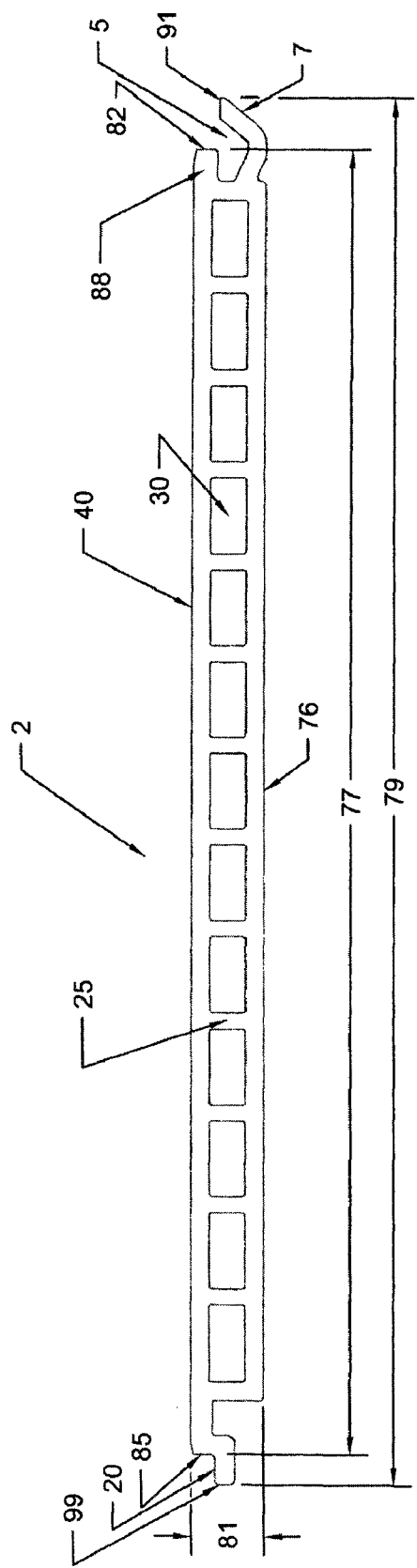
FIG. 6 is a large scale representation of a cross-section according to line IV-IV in FIG. 1.

As illustrated in FIG. 6, which is a large scale representation of a cross-section according to line IV-IV of FIG. 1, in some exemplary embodiments, the width of the plank 2, from point 82 to point 85 (the distance 77), can be any length, such as, for example, can be from about 5 inches to 16 inches. Furthermore, the plank 2 can include a tongue and groove in which case the plank 2 can have a width from point 91 to point 99 (the distance 79). The plank 2 of FIG. 6, also has a height 81 which can be from about 0.25 to about 0.75 inch. The groove 5 is defined by the second flange 7 protruding from the second side 76 of the plank 2 and the first opposing flange 88 protruding from the first opposite side 40 of the plank 2 along the first edge. The cantilevered tongue 20 can protrude from the first side 40 of the plank 2 opposite from the second side 76 and extending along the second edge of the plank 2.

As discussed above, a feature of the present teachings is to provide a panel or a plank comprising a groove defined, at least partially, by a first flange protruding from a first side of the plank along a first edge of the plank, and a second opposing flange protruding from a second, opposite side of the plank along the first edge. The first flange protruding from the first side of the plank can terminate at a distal first flange edge, and the second flange protruding from the second side of the plank can extend distally beyond the distal first flange edge and curve or angle toward the distal first flange edge to define an opening into the groove that is accessible at an angle from the first side of the plank. As shown in FIG. 6, the second flange curves or angles in a direction toward the horizontal plane of the first side 40.

A cantilevered tongue can be provided protruding from a second side of the plank opposite from the first side and extending along a second edge of the same plank. The cantilevered tongue can be provided with a S-shaped configuration so that a distal edge of the cantilevered tongue is offset from the second side of the plank. The groove can be configured to receive the tongue in a first relative orientation of two similarly configured planks as the two planks are moved toward each other in a direction substantially perpendicular to the first and second edges of the planks. The opening into the groove can allow receipt of the cantilevered tongue with a S-shaped configuration as the two planks are positioned in the first relative orientation, wherein one of the planks is angled relative to the other plank with respect to their first and second sides.

The tongue and groove ensures that two connecting panels can be firmly coupled to each other to desirably avoid lateral movement in the horizontal plane (along the plane of the core) and desirably avoid movement in a vertical plane (along a plane perpendicular to the plane of the core) with respect to each other. An exemplary embodiment is illustrated in FIG. 7.

Figure 7:
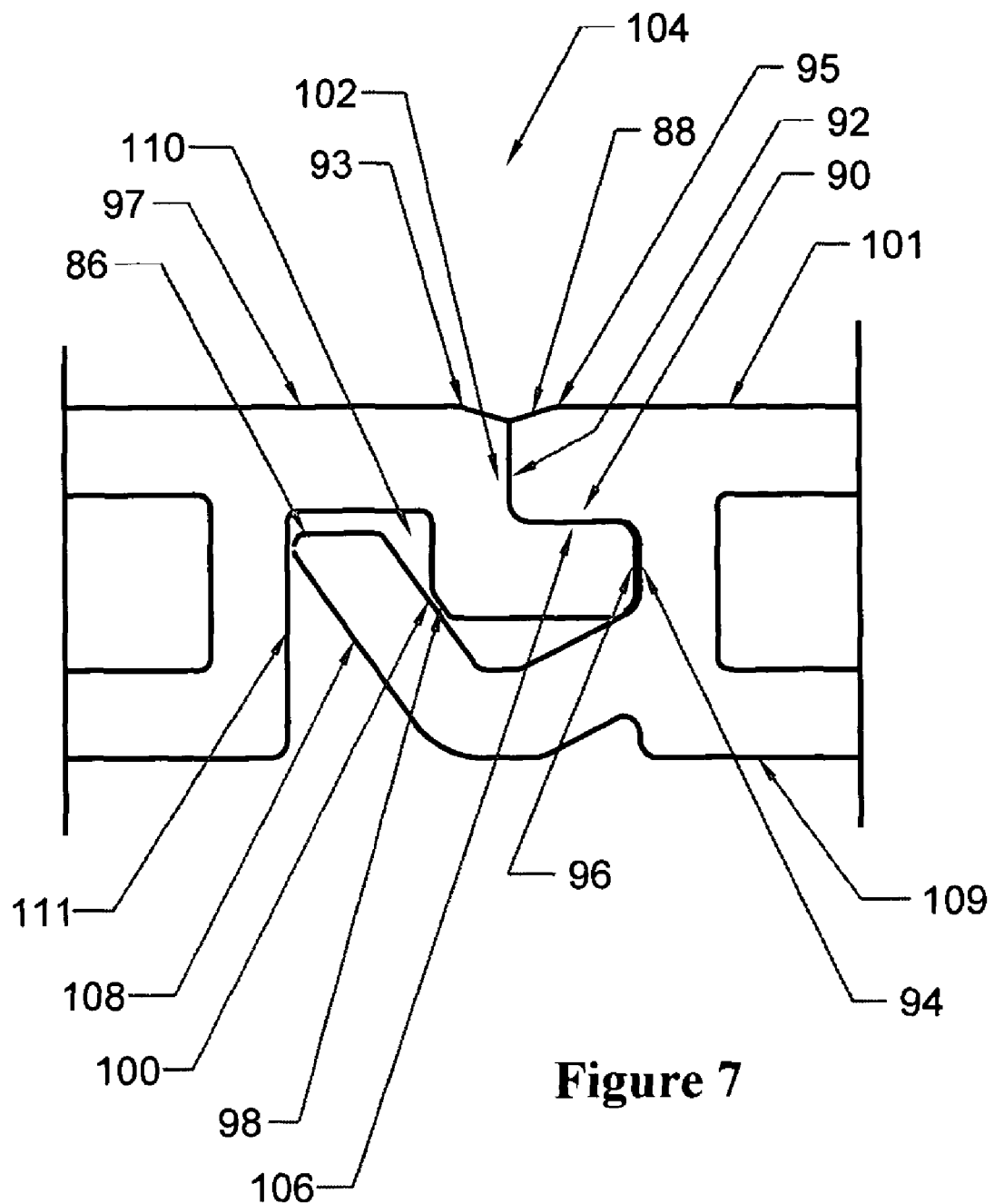
FIGS. 7 to 13 are large scale representations and represent a number of variants of the coupling systems according to the present invention.

FIG. 7 provides an exemplary coupling system 104 according to the present teachings. In the coupling system 104 of FIG. 7, two floor panels are designed to mate with one another and when mated, cannot move in a vertical or horizontal direction with respect to each other. In order to limit or eliminate any lateral movement in a horizontal plane with respect to an adjacent plank, the portion 98 (bottom corner) of the cantilevered tongue 97, which has an angle to provide a larger surface area that is, at least partially, in contact with a portion of the second side 100 of the second flange 108 that can protrude from the first side and can define a portion of the groove. Furthermore, the front side 92 of the first flange 88 that can protrude from the first side 101 of the plank, and the inner side 94 of the groove can be in contact with or substantially in contact with the tip 96 of the cantilevered tongue 97, and the front side 102 of the cantilevered tongue 97. Additionally, to avoid any vertical movements, the side 90 of the first flange 88, which defines a portion of the groove, can be in contact with or substantially in contact with the top side 106 of the cantilevered tongue 97. Furthermore, the tip 86 of the second flange 108 can be in contact with at least a portion of back side 110 and/or side 111 of the cantilevered tongue 97 to further prevent any downwardly vertical movements. Both the tongue and the groove can have beveled edges 93 and 95, respectively. Preferably, the beveled edges 93 and 95 include a coating or film, such as, for example, a decorative layer or wrapped high pressure laminate film.

The cantilevered tongue 97 of FIG. 7 can have any dimension. The tip 96, side 102, side 106, side 110, and side 111 of the cantilevered tongue 97 can have any length. Additionally, the second flange 108 protruding from the second side 109 and the first flange 88 protruding from the first side 101 can have any dimensions. As illustrated in exemplary FIG. 7, side 92 of the first flange 88 can have a length equal to, substantially equal to, or smaller than the length of the side 90 of the first flange 88.

Figure 8:
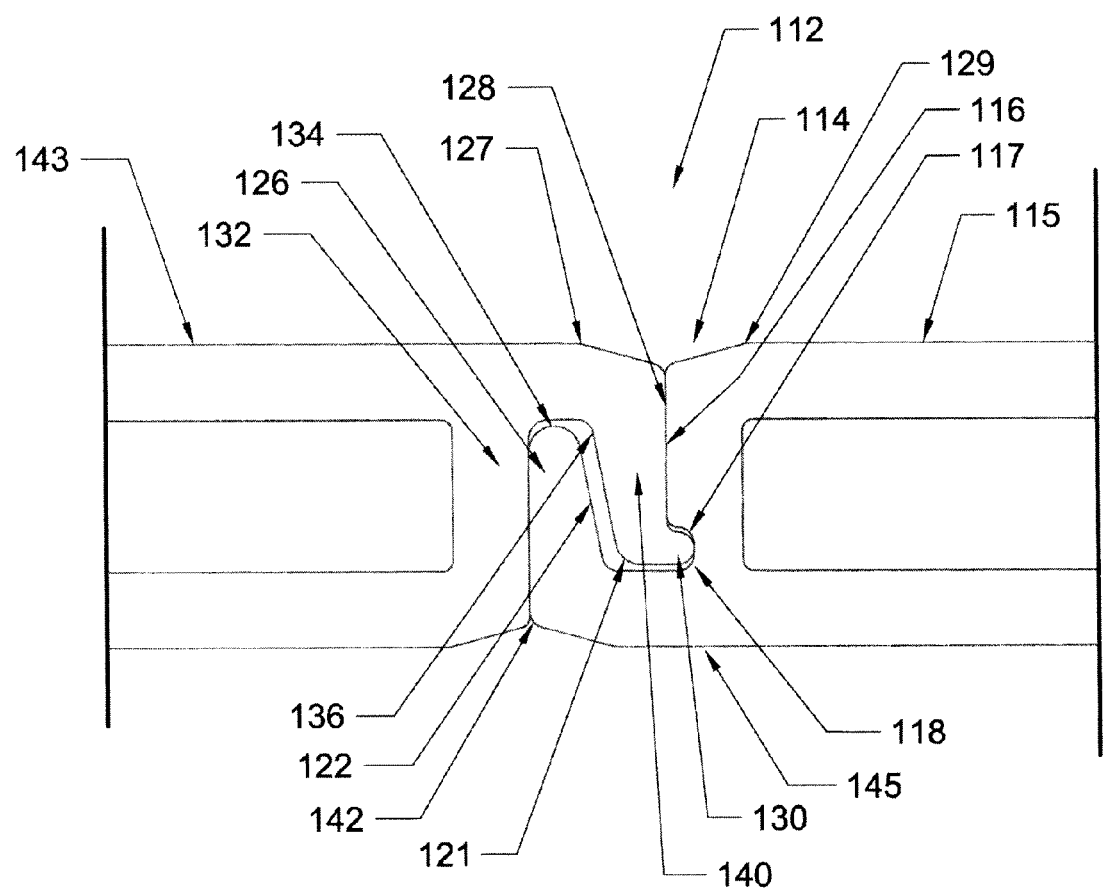

In various embodiments, the tongue and groove can be shaped wherein the second flange has a length that is longer than the first flange. For instance, the second flange can have a length 2 times to 4 times longer than the first flange as measured from point 94 in FIG. 7. FIG. 8 illustrates another coupling system 112. According to FIG. 8, the first flange 114 protruding from first side 115 has a first side 116 that can be longer than the second side 117. In the coupling system 112, both the tongue and the groove have beveled edges 127 and 129, respectively. Preferably, the beveled edges 127 and 129 include a coating or layer, such as, for example, a decorative coating or layer. Furthermore, the second flange 142 protruding from the second side 145 of the plank can be inserted into and occupy the space defined by the second side 136, the third side 134, and the fourth side 132 of the cantilevered tongue 140 protruding from second side 143 of the plank. Thus, the first side 128 and the second side 136 of the tongue 140 are in contact with the first side 116 of the first flange 114, and the fourth side 122 of the second flange 142, which defines a portion of the groove, to avoid any horizontal movement of the planks. Additionally, according to FIG. 8, the tip 130 of the cantilever tongue 140 can be in contact with the third side 118 of the first flange 114. Furthermore, the third side 118, the fourth side 122, and the fifth side 126 of the second flange 142 protruding from the first side 145 of the plank can be in contact with the fifth side 121, the second side 136, and the fourth side 132, respectively, to prevent any vertical movements. The second flange 142 can be inserted into a space defined by the second side 136, the third side 134, and the fourth side 132 of the cantilevered tongue 140, in a manner so that the fifth side 126 of the second flange 142 can be in contact with the fourth side 132 of the adjacent plank.

The dimensions of the tongue and groove of FIG. 8 can vary depending on the application of the tongue and groove.

Figure 9:
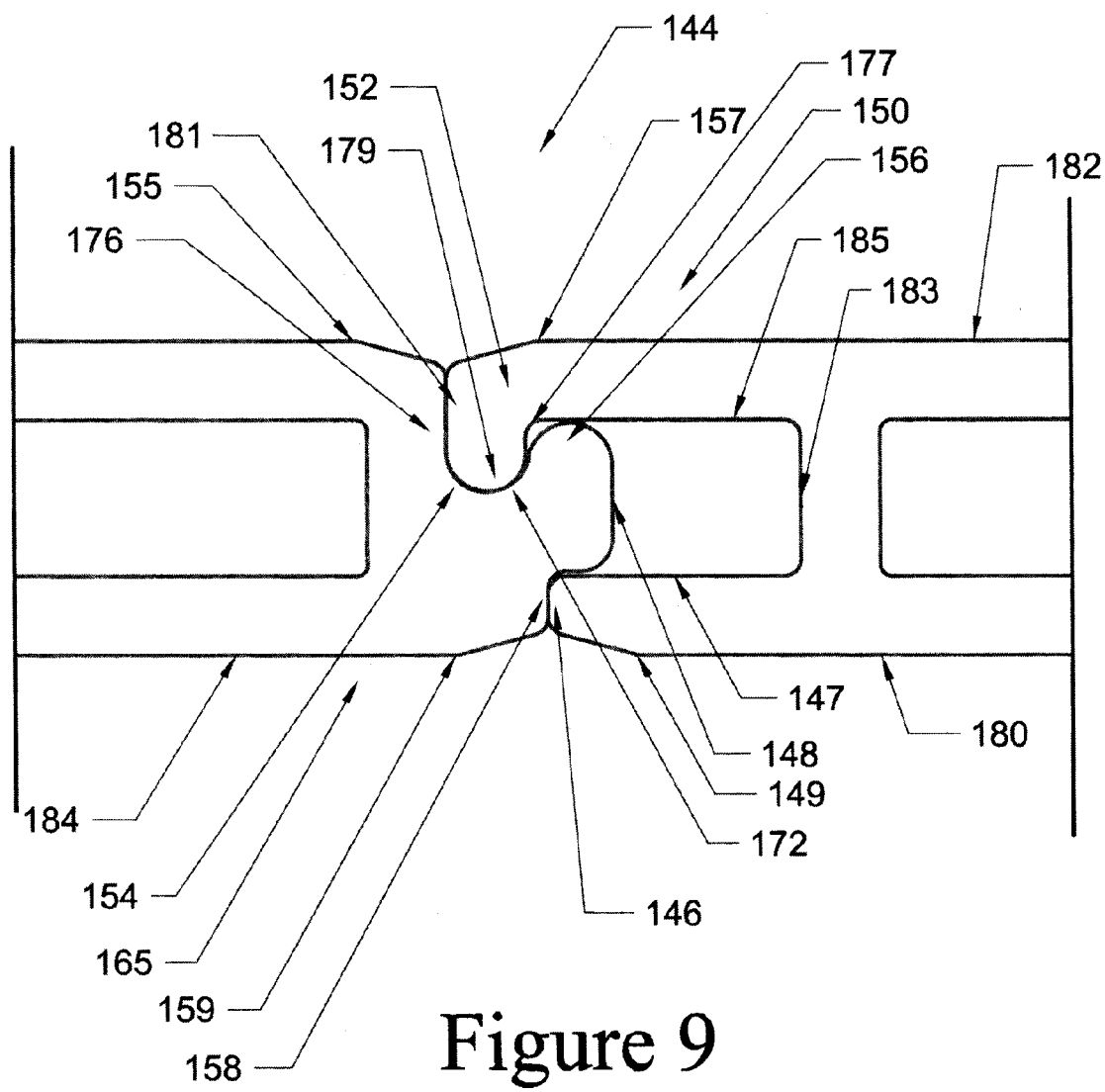

Furthermore, alternatively, the tongue and groove can be designed as illustrated in FIG. 9. In the exemplary embodiment as illustrated in FIG. 9, the groove can be defined, at least partially, by the first flange 149 protruding from the first side 180 of the plank and the second opposing flange 150 protruding from the second side 182. A cantilevered tongue 156 can be provided protruding from the first side 184. According to FIG. 9, the first inner side 147 of the first flange 149 of the groove can be in contact with the first side 158 of the tongue 156. Furthermore, according to FIG. 9, the tip area 152 of the second flange 150 can have the first side 177, the second side 179, and the third side 181. The second flange 150 can come in contact with the third side 172, the fourth side 154, and the fifth side 176 of the tongue 156, respectively. Thus, in this design, the second side 148 of the tongue 156 can be placed in the cavity defined by the first inner side 147, the second inner side 183, and the seventh inner side 185. In the coupling system 144, both the tongue and groove can have beveled edges 155 and 157, respectively. Preferably, the beveled edges 155 and 157 include a coating, such as, for example, a decorative coating.

The tongue 156 of FIG. 9 can have any length such as from about 0.13 to about 0.15 inch. The tongue and groove of the present application can have any dimension or shape, depending on the application of the tongue and groove. The panels of the present teachings are not limited to the drawings as illustrated in FIGS. 1-14.

Figure 10:
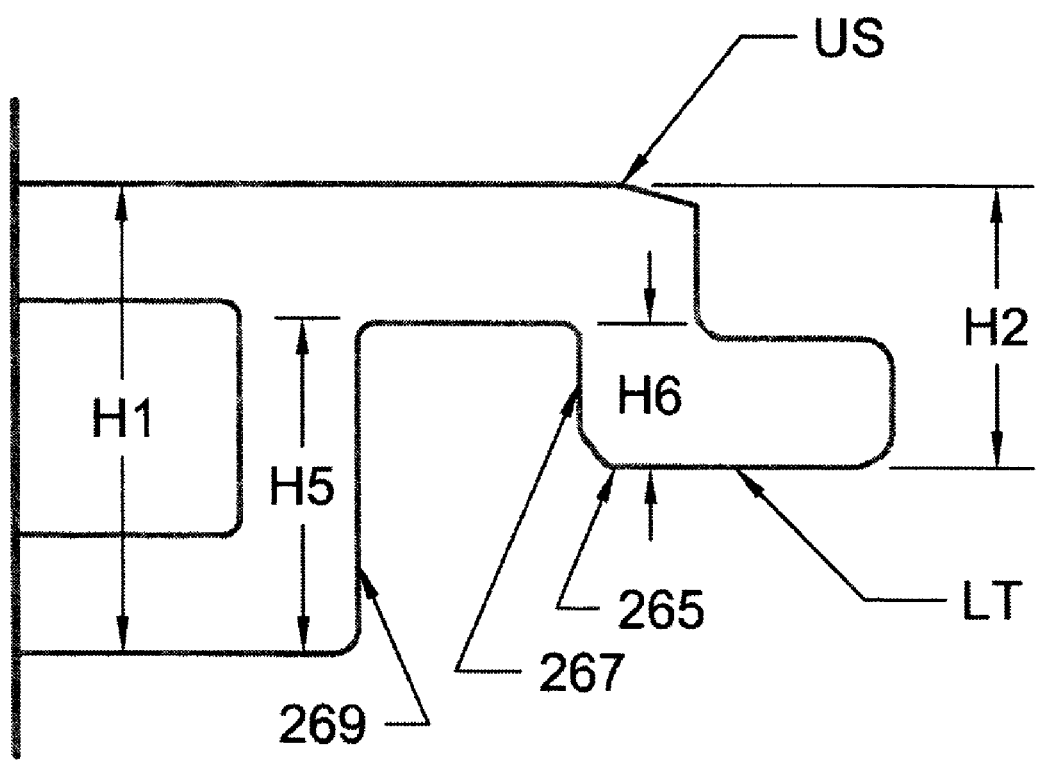

In one embodiment of the present invention, the present invention relates to a tongue design for connecting planks or tiles wherein the height of the overall tongue, as measured from the top of the plank to the lower surface forming the tongue, is at least 50% of the overall height of the plank. For example, as shown in FIG. 10, the overall height of the plank is shown as $H_1$ and the overall height of the tongue portion of the plank is shown as $H_2$. The lower surface of the tongue is identified by LT and the upper surface or top surface of the tongue, as well as the top surface of the overall plank is indicated as US. From FIG. 10, $H_2$ is at least 50% of $H_1$ and more preferably is at least 60% or at least 65% or at least 70% of $H_1$. Preferably, $H_2$ is from about 60% to about 75% of $H_1$ or from about 65% to about 80% of $H_1$.

In another embodiment, the groove profile of the plank or tile can have a design or profile such that the height of the lower flange of the groove, as measured from the lower surface of the overall plank to the highest point in the lower flange, is over 50% of the overall height of the plank. In more detail, and as an example, in FIG. 11a, the overall height of the plank is represented or shown by $H_1$. The overall height of the lower flange, which forms part of the groove, is shown as $H_3$. As can be seen, $H_3$ is at least 50% of $H_1$ and can be at least 55%, at least 60%, at least 65%, at least 70%, or at least 75% of $H_1$. For instance, $H_3$ can be from about 55% to about 75% of $H_1$ or it can be from about 55% to about 70% of $H_1$ or it can be from about 60% to about 75% of $H_1$.

Figure 11A:
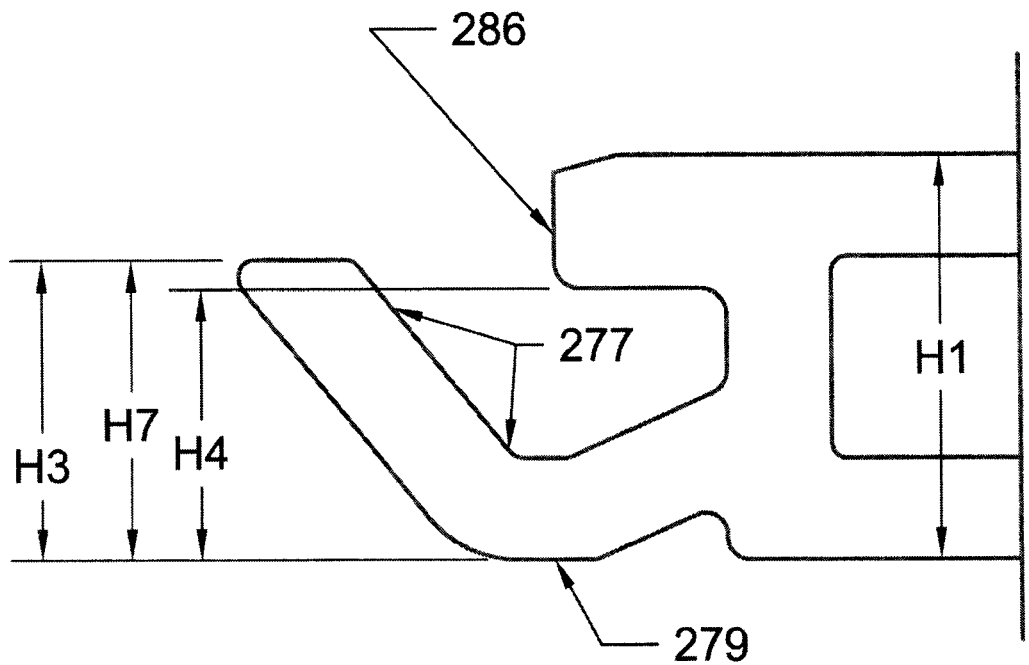

In another embodiment, the highest point of the lower flange, which forms the groove profile, is higher than the height of the lower surface of the upper flange, which forms the cavity of the groove. For instance, as shown in FIG. 11a, as stated above, the height is shown by $H_3$ for the lower flange of the groove and the height of the lower surface of the upper flange is shown as $H_4$. $H_4$ is essentially defining the height of the cavity in the groove profile. In this embodiment, $H_3$ is greater than $H_4$. Preferably, $H_3$ is at least 5% more, at least 10% more, at least 15% more, or at least 20% more than $H_4$. For instance, $H_3$ can be from 5% to 15% more than $H_4$. The advantage of having such a design is that when the tongue enters the cavity of the groove, having a lower flange that is higher than the height of the cavity permits a better mechanical lock, which prevents the tongue from moving horizontally on the plane of the connected planks. This has many advantages over previous tongue and grooves designs.

In another embodiment, the present invention relates to a tongue profile and a groove profile that are not identical or even nearly identical with respect to mating surfaces. In other words, the tongue profile and the outline of the groove profile are not identical from the standpoint that they would match each other like a square cube going into a recess having the same square dimensions. As can be seen from comparing, for instance, FIGS. 10 and 11, the groove profile does not at all mimic the tongue profile and the two profiles are significantly different or are not mirror images of each other.

In addition, in another embodiment of the present invention, the tongue profile of the plank of the present invention can have a large gap or space behind the tongue portion. In more detail, and as an example, referring to FIG. 10, 265 refers to the end or back corner of the tongue. 267 refers to the back wall of the projecting tongue. As shown in FIG. 10, there is a gap or space located between the back wall of the tongue (267) and the wall identified as 269. The height of this gap, for instance, is shown as $H_6$ in FIG. 10, and the height of wall 269 is shown as $H_5$. In one embodiment of the present invention, $H_6$ has a value that is at least 10% of $H_5$ and, more preferably, at least 15%, at least 20%, at least 25%, at least 30%, at least 35%, at least 40%, at least 50%, at least 60%, or at least 70% of the value $H_5$. For instance, $H_6$ can be from about 10% to about 70% of the value of $H_5$ or it can be from about 15% to about 70% of the value of $H_5$ or from about 20% to about 70% of the value of $H_5$.

Figure 12:
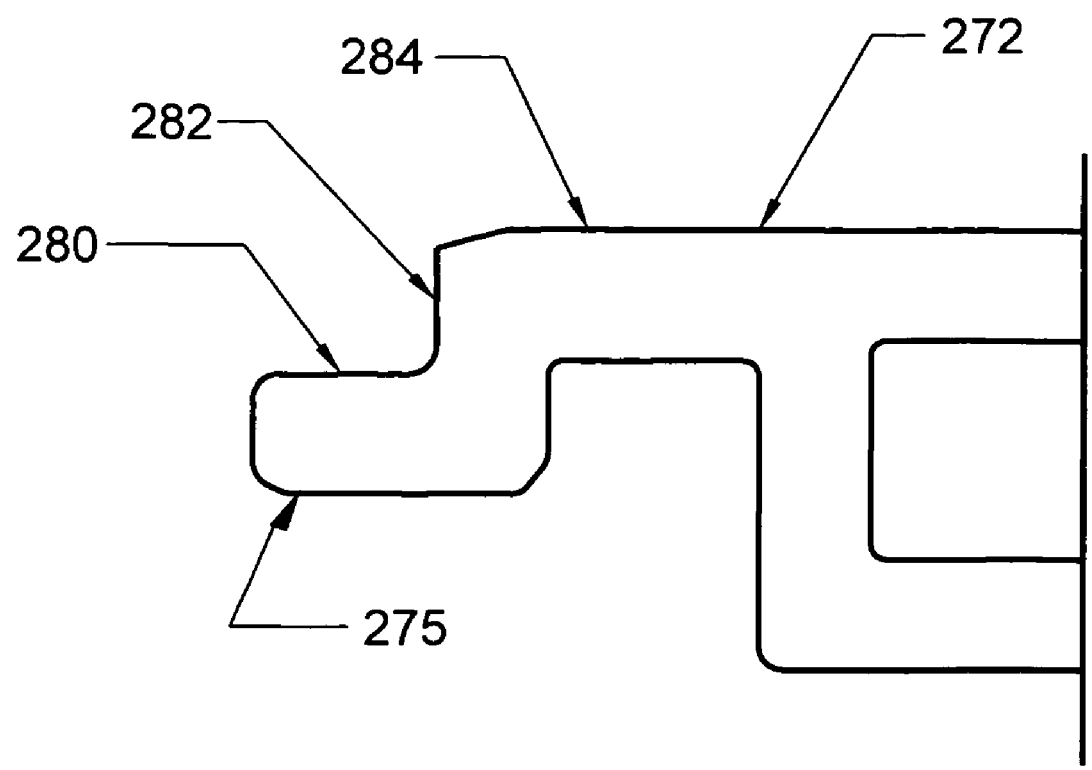

The S-shaped configuration, which is part of the tongue profile, is exemplified in FIG. 12. 272 refers to the beginning of the S-shaped configuration and essentially would be the top of the S-shape, and 275 refers to the bottom of the S-shape. 280 refers to the lower segment of the S-shape, 282 refers to the middle segment of the S-shape, and 284 refers to the upper segment of the S-shape. The thickness of each of these segments can be the same or different. Each segment can be within 20% in thickness from any of the other S-segments or can be within 10% or less.

In another embodiment of the present invention, the groove profile has a lower flange portion which defines the bottom or lower surface of the groove. As shown in FIG. 11a, the height of the lower flange, as measured from the bottom surface of the plank, is defined as $H_7$. The lower flange is angled in an upward direction as shown, for instance, in FIG. 11b, wherein the angle is identified as $A_1$. The angled portion of the lower flange is identified as 277 in FIG. 11a. The angle can be from about 40° to about 80° or it can be from about 50° to about 80° or from about 55° to about 75°. The groove profile, as shown by the lower flange identified as 279, has a gap shown by $H_7$ and $W_1$.

Figure 11B:
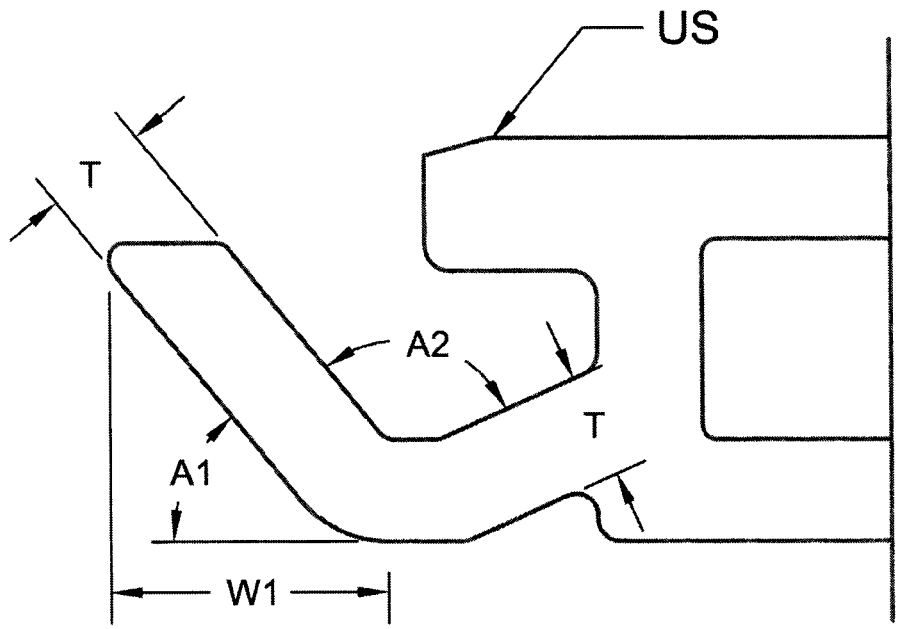

As shown in FIGS. 11a and 11b, the lower flange 279 of the groove profile can have an angle $A_2$ of at least 50°, such as at least 60°, at least 70°, at least 75°, at least 80°, at least 85°, or at least 90°. Suitable ranges for $A_2$ can be from about 50° to 90°, from about 60° to about 90°, from about 75° to about 90°.

Any of the above embodiments can be present with any other described embodiment. Thus, the plank can have one or more of the various embodiments combined.

Figure 13:
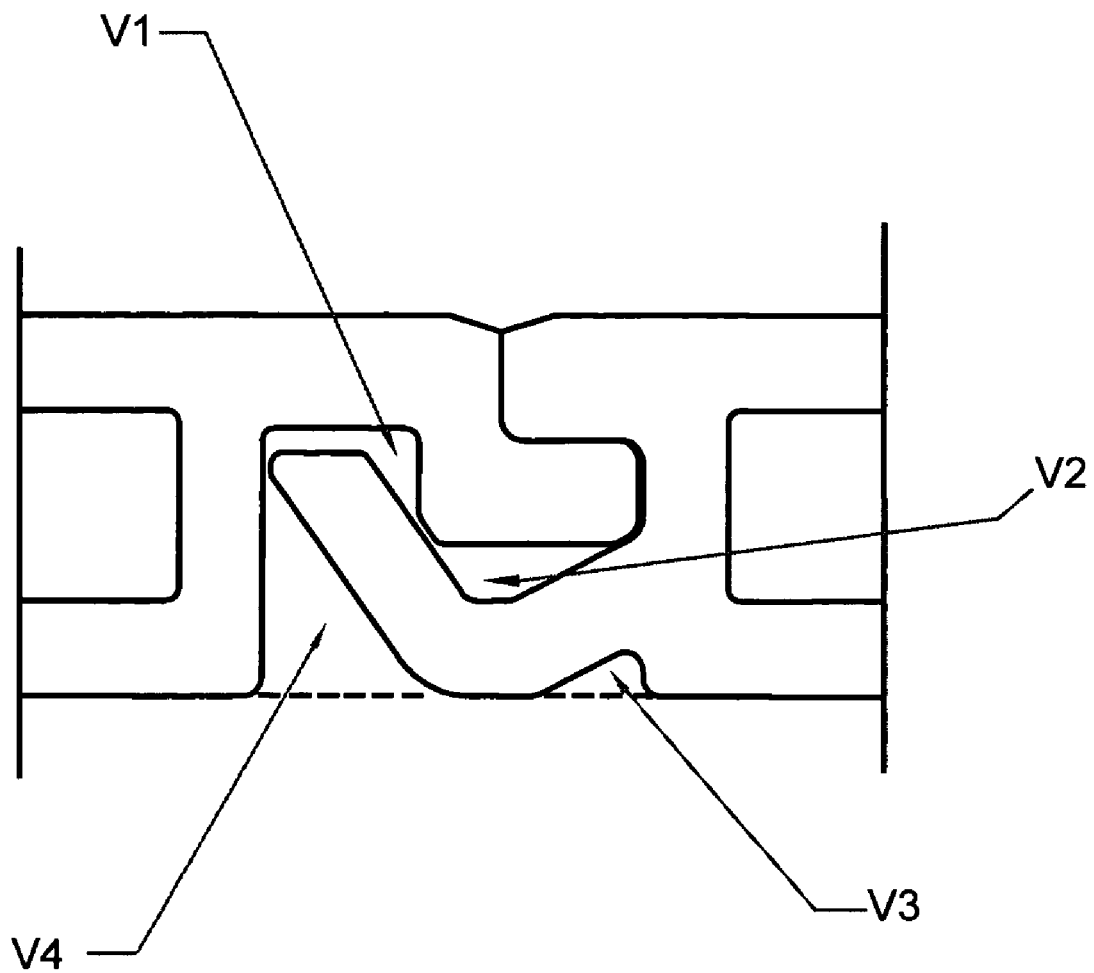

In another embodiment of the present invention, the panels of the present invention have a tongue profile and a groove profile such that when the tongue profile and groove profile are connected to form a mechanical lock, the void volume that exists amongst the connected tongue and groove is significant, especially compared to conventional tongue and groove profiles. For instance, the void volume that exists above the lower flange (or second flange as described herein in many embodiments) is at least $3.5 \text{ mm}^2 \text{X L}$, wherein L is the length (in mm) of the tongue or groove along the side of the plank. Thus, the void volume (in $\text{mm}^3$) would be at least $3.5 \text{ mm}^2$ multiplied by the length of the tongue or groove (in mm) along the side of the plank. The length of the tongue and the length of the groove should be the same. Preferably, the void volume (in $\text{mm}^3$) is at least $3.8 \text{ mm}^2 \text{X L}$ or a void volume of from $3.75 \text{ mm}^2 \text{X L}$ to about $6.5 \text{ mm}^2 \text{X L}$. This void volume, for instance, reflects the amount of open space that exists once the tongue and groove are connected together and further shows the amount of open space which permits the tongue to engage the groove or vice versa in an easy fashion, and yet obtain and maintain a good mechanical lock. In addition, as an additional option or embodiment, the tongue and groove, upon being connected to form a mechanical lock, can further have a void volume (in $\text{mm}^3$) below the lower flange or second flange in an amount of at least $2.5 \text{ mm}^2 \text{X L}$, or at least $5 \text{ mm}^2 \text{X L}$, or at least $7 \text{ mm}^2 \text{ X L}$, such as from about $3 \text{ mm}^2 \text{X L}$ to about $10 \text{ mm}^2 \text{X L}$, or from about $6 \text{ mm}^2 \text{ X L}$ to about $9 \text{ mm}^2 \text{ X L}$. For example, L can be from 50 mm to 200 mm. As an example, FIG. 13 shows these void volumes as $V_1, V_2, V_3,$ and $V_4$. $V_1$ and $V_2$ are above the second (or lower) flange and $V_3$ and $V_4$ are below the second flange.

In at least one embodiment of the present invention, the tongue profile and the groove profile are designed such that the tongue and groove can be connected multiple times without a decrease in locking strength and also, or alternatively, without a decrease in the tightness of the mechanical lock between the tongue and groove. With many previous conventional tongue and groove systems, the connecting of the tongue with the groove can only be done once or twice before the integrity of the tongue and/or groove dramatically decreases, resulting in a mechanical lock that is loose or faulty. The present invention, in at least one embodiment, permits multiple connecting between the tongue and groove, and yet retains connecting strength and tightness of the mechanical lock, which is the same or better as compared to the first time that the tongue and groove are connected together.

In another embodiment of the present invention, the present invention can be a plank having the tongue and/or groove profile as discussed above on at least two side edges of the four-sided plank (i.e., a plank with 4 side edges), but in lieu of the protruding lip and the recess, the plank can have the same or similar tongue profile on one remaining side edge of the plank and a same or similar groove profile on the other remaining side edge of the same plank. Essentially, any combination of groove and tongue profiles of the present invention can be present on the plank. Alternatively, the plank can have one side edge with the tongue profile, as described above, and the opposite side edge having a groove profile, as discussed above, and then on the remaining two opposing side edges, the sides can have straight edges with no mechanical lock or connecting system or it can have conventional tongue/groove or conventional spline and groove connections or other connecting means. For purposes of the present invention, in at least one embodiment, the planks of the present invention have at least the tongue profile on at least side edge of a plank, and a groove profile on at least one other side edge of the plank (e.g., the opposing side), whereas the remaining two side edges of a four-sided plank can have other connecting means, such as tongue/groove systems, mechanical lock systems, adhesive systems, and/or spline systems, and the like.

In one or more embodiments of the present invention, the panels of the present invention can have a tongue profile and a groove profile such that the panels having these profiles can be joined together by inserting the tongue of one panel into the groove of another panel or inserting the groove of a panel into a tongue of another panel while one panel is lying flat on a surface. With conventional tongue and groove designs and laminate flooring, the tongue and groove are designed such that the tongue of one panel must be inserted into the groove of a second panel (while the second panel having the receiving groove is lying flat), but it is not possible to insert the groove of one panel into the tongue of a second panel while the second panel is lying flat. The design of the tongue and/or groove in conventional laminate flooring simply does not make this possible. Needless to say, this has immense disadvantages when one is laying a floor since the tongue must always be inserted into the groove connector of a second panel. This disadvantage is avoided in one or more embodiments of the present invention based on the design of the tongue profile and/or groove profile.

The surface-covering of the present invention can be for flooring surfaces. The connecting and surface-covering system of the present invention can be used in a variety of applications, including, but not limited to, wall panels, ceiling panels, decks, patios, furniture surfaces, shelves, and other surface-coverings or parts thereof. The connecting system of the present invention can be used to connect a variety of surface-covering products. Any surface-covering product capable of being formed into a plank such that the surface-covering of the present invention can be used as part of this invention to form the surface-covering. For instance, laminate floor products can be connected by the connecting system of the present invention. Other floor products that can be connected together by the connecting system of the present invention include, but are not limited to, plastic-containing products, such as, for example, hard surface products. The plank of the present invention having a groove, optional shoulder, tongue, and optional protruding lip can be formed by milling/cutting techniques, extrusion, injection molding, and the like. In cellulosic-type products, the groove and optional shoulder can be machined into dimensions to receive the tongue and optional protruding lip of a similar plank. The planks of the present invention can also be formed by other molding techniques or other conventional technology used to form polymeric materials having designed shapes and forms.

The planks or panels of the present invention can be made from a polymeric material. The polymeric material of the plank of the present invention can comprise a thermoplastic material, although other types of polymers can also be used. Examples of polymeric materials that can be used to form the plank of the present invention include, but are not limited to, vinyl-containing thermoplastics, such as polyvinyl chloride, polyvinyl chloride/rubber blends, polyvinyl acetate, polyvinyl alcohol, and other vinyl and vinylidene resins and copolymers thereof; polybutyleneterephthalate (PBT), polyethylenes such as low density polyethylenes and high density polyethylenes, polyethyleneterephthalate (PET), and copolymers thereof; styrenes, such as acrylonitrilebutadiene styrene (ABS), SAN, and polystyrenes and copolymers thereof; polypropylene and copolymers thereof; saturated and unsaturated polyesters; acrylics; polyamides, such as nylon containing types; engineering plastics, such as acetal, polycarbonate, polyamide, polysulfone, and polyphenylene oxide and sulfide resins and the like. One or more conductive polymers can be used to form the plank that has applications in conductive flooring and the like. The thermoplastic polymers set forth in Kirk Othmer ($3^{rd}$ Edition, 1981) at pp. 328 to 848 of Vol. 18 and pp. 385-498 of Vol. 16, (incorporated in their entirety by reference herein) can also be used as long as the resulting plank has sufficient strength for its intended purpose. The planks can contain optional ingredients like wood flour, cellulosic fibers, and/or conventional polymeric additives, like flame retardants, UV protectors, stabilizers, plasticizers, and the like. The polymeric planks of U.S. Pat. No. 6,617,009 can be used herein, with the profiles of the present invention.

The plank of the present invention can also be made from other materials, such as fiberboard, particle board, various types of laminates, such as high-pressure laminates, natural, organic, recycled, or synthetic materials, solid wood, engineered wood, and the like. The planks can be made from any conventional materials used in the laminate or plank flooring industry.

With respect to the mechanical lock between the tongue and groove in the present invention, in one embodiment, there is no play between the tongue and groove once the tongue is locked into the groove or vice versa. Furthermore, in one embodiment, there is no biasing or spring force in the tongue and/or groove or tension created by the tongue locking into the groove or vice versa. In at least one embodiment of the present invention, the tongue profile and/or the groove profile are rigid enough such that the flexing of the profiles that mate with one another is essentially zero or is zero. In other embodiments, there can be a biasing or spring force or tension created when the tongue engages the groove or vice versa.

The planks of the present invention can include a top layer on the core. For example, the top layer can include (a) a high pressure laminate construction that is comprised of an impregnated underlayer Kraft paper, a printed decorative layer, and an impregnated protective overlay compressed together with heat and pressure to become one single layer; (b) a wood veneer; or (c) a vulcanized cellulose layer that is made from a number of plies of paper treated with zinc chloride, an acid to make the surfaces of the paper gummy and sticky, wherein the gummy plies are then pressed together. The plank of the present invention does not require a backing layer. Preferably, in at least some embodiments, the planks have no backing layer. In other embodiments, a conventional backing layer can be present.

In addition, the decorative element such as wood grains and/or knots texture can be embossed (e.g., mechanical or engraved), wherein the design can then be directly printed on the surface using, for example, a non-contact type digital printing technology. Another option is to incorporate the pigments into an extrusion operation to create a wood grain look on the surface of the planks by disturbing the material flow in the extruder. The decorative element can be any design, like natural appearances, stone, brick, tile, ceramic, wood, marble, and the like or can be other designs common to or used by the floor industry. The design and overall upper layers can be textured, such as embossed in register with the design.

In one example, the top layer is a laminate on top of the core; a print layer can be affixed to the top surface of the core, wherein the print layer has a top surface and a bottom surface. The print layer, preferably, is an aminoplast resin impregnated printed paper. Preferably, the print layer has a printed design. The printed design can be any design which is capable of being printed onto the print layer. The print layer is also known as a decor print layer. Generally, the print layer can be prepared by rotogravure printing techniques or other printing means such as digital printing. Once a design is printed on the paper, the paper can then be impregnated with an aminoplast resin or mixtures thereof. Preferably, the aminoplast resin is a blend of urea formaldehyde and melamine formaldehyde. With respect to the optional laminate on top of the core, a print or design or decorative layer can be affixed to the top surface of the core, wherein the print layer has a top surface and a bottom surface. The print layer preferably is an aminoplast resin impregnated printed paper. Preferably, the print layer has a printed design. The printed design can be any design which is capable of being printed onto the print layer. The print layer is also known as a decor print layer. Generally, the print layer can be prepared by rotogravure printing techniques or other printing means such as digital printing. Once the paper has the design printed on it, the paper is then impregnated with an aminoplast resin or mixtures thereof. Preferably the aminoplast resin is a blend of an urea formaldehyde and a melamine formaldehyde. The design or print layer can simulate any natural surface, such as wood, ceramic, concrete, tile, brick, stone, or non-natural looking surfaces. Essentially, any type of design, whether natural in appearance or not, can be used as the design on the print layer or can be the design located on the plank by methods described below or methods conventional in the area of surface coverings.

The print paper, also known as the Deco paper, preferably should have the ability to have liquids penetrate the paper such as a melamine liquid penetrating in about 3 to 4 seconds and also maintain a wet strength and even fiber orientation to provide good reinforcement in all directions. Preferably, the resin used for the impregnation is a mixture of urea formaldehyde and melamine formaldehyde resins. Urea formaldehyde can contribute to the cloudiness of the film that is formed and thus is not preferred for dark colors and the melamine resin imparts transparency, high hardness, scratch resistance, chemical resistance, and good formation, but may have high shrinkage values. Combining urea resins with melamine resins in a mixture or using a double impregnation (i.e., applying one resin after another sequentially) can provide a positive interaction in controlling shrinkage and reducing cloudiness. Preferably, the type of paper used is 75 g/m² weight and having a thickness of 0.16 mm. The saturation of the coating preferably is about 64 g/m².

Located optionally on the top surface of the print layer can be an overlay. The overlay which can also be known as the wear layer is an overlay paper, which upon being affixed onto the print layer, is clear in appearance. The overlay paper is, preferably, a high abrasive overlay which, preferably, has aluminum oxide embedded in the surface of the paper. In addition, the paper is impregnated with an aminoplast resin just as with the print layer. Various commercial grades of high abrasive overlays are, preferably, used such as those from Mead Specialty Paper with the product numbers TMO 361, 461 (70 gram/m² premium overlay from Mead), and 561 wherein these products have a range of Taber values of 4000 to 15000. The type of paper preferably used is about 46 g/m² and having a thickness of about 0.13 mm.

With respect to the print layer and the overlay, the amount of aminoplast resin is, preferably, from about 60 to about 140 g/m² and more preferably from about 100 to about 120 g/m².

As an option, an underlay can be located and affixed between the bottom surface of the print layer and the top surface of the core. Preferably the underlay is present and can be paper impregnated with an aminoplast resin as described above with respect to the print layer and overlay. Preferably, the underlay is Kraft paper impregnated with aminoplast resins or phenolics and more preferably phenolic formaldehyde resin or melamine formaldehyde resin which is present in an amount of from about 60 g/m² to about 145 gm² and, more preferably, from about 100 g/m² to about 120 g/m² paper. The type of paper used is, preferably, about 145 g/m² and having a thickness of about 0.25 mm. The underlay is especially preferred when extra impact strength resistance is required.

Other types of layers, which can be used in the present invention, such as wood veneer and vulcanized cellulose layers, can include the same components with respect to the conventional laminate surfaces. Wood veneers used as the top layer can be any type of species such as oak, maple, cherry, hickory, beech, pine, walnut, mahogany, chestnut, and teak and the like. The thickness of the veneer can be in the range of 0.005 inch to 0.250 inch. Preferably, the thickness of the veneer is in the ranges of 0.080 inches to 0.160 inches. The veneer on the top can be decorated with a printed design to highlight the grains or knots or to mimic certain wood species or to emboss the surface to create vintage appearance and the like. A radiation curing urethane acrylate coating(s) or other protective coating(s) can be applied on the surface to provide the required surface properties such as scratch and wear resistance, scuff resistance, stain and chemical resistance and the foremost importance is the appearance retention. The coating can incorporate the abrasive resistance particles in the urethane or other coating for better surface protection. The coating can have an abrasion level of 500-1500 cycles per NALFA test.

In addition, the excellent moisture resistance and sound deadening qualities of this product can eliminate the need for underpadding, though use of underpadding is an option.

A further embodiment of the present invention relates to a plank which comprises the same plank described above but, in lieu of a top layer on top of the plank, a design is printed directly on the top surface of the plank using any number of printing techniques such as gravure printing, transfer printing, digital printing, flexo printing, and the like. Or, a printed thermoplastic film (e.g., PVC) or a wood veneer and the like can be laminated to a thermoplastic plank. A protective coating can then be placed on top of the printed design. Any type of protective coating or wear layer can be used, such as a polyurethane type coating with or without wear resistant particles in the coating. Thus, a plank would have a core, where the core has a top surface and bottom surface as well as opposing sides and a printed design directly on the top surface of the plank and optionally at least one protective coating on top of the printed design. The top surface of the plank as described earlier can have a textured surface as described above.

This type of plank can be made by extruding a material containing at least one polymeric material into the shape of the core and then printing a design directly on the top surface of the plank and then, optionally, applying at least one protective coating on top of the printed design and curing the protective coating. The protective coating can be applied by conventional techniques, such as with a curtain coater, direct roll coater, vacuum coater, differential roll coater, air knife coater, or spray apparatus.

In another embodiment of the present invention, a plank for surface coverings, such as flooring, has a core and an extruded layer on the top surface of the core, wherein the extruded layer includes at least one thermoplastic material with one or more pigmented compounds. The extruded layer on top of the extruded core can simulate various designs such as wood grain and the like.

The plank in this embodiment can be made by co-extrusion techniques which involve extruding the core and extruding either simultaneously or subsequently a layer containing at least one thermoplastic material with one or more pigmented compounds on top of the extruded core.

Another embodiment involves a plank having the same design as described above with a printed polymeric film, such as a PVC film placed on the top surface of the extruded core. The printed polymeric film can be a polymeric film having a printed design on the film wherein the film would preferably be from about 10 to about 20 mil thick. One or more wear layers or protective coatings can be placed on top of the printed polymeric film. The polymeric film can be placed on top of the extruded core by typical lamination techniques, such as heating the printed film, then pressing the film to the extruded core to bond them together, or using glue to bond them together.

In the preferred embodiment, where the core material is thermoplastic, like polyvinyl chloride, the core material, in this case, can be produced by metering the appropriate quantities of rigid vinyl compound and color concentrate into the feed end of an extruder. The extruder imparts the appropriate properties on the material through the manipulation of heating zones, cooling zones, screw temperature and rpm. The material then exits the extruder through a metal die which is machined with the intended profile design. As the material passes through the die the exiting mass (continuous in length) takes the shape of the machined profile. The profiled material exiting the extruder then enters a calibration unit which controls and if necessary manipulates critical dimensions through the cooling process. The calibration unit utilizes water temperature and flow rate to control profile measurements. The material exiting the calibration unit is a cooled continuous plank with specific profile dimensions. The cooled continuous plank is then fed into a cutter device which cuts the planks into specific lengths.

The wrapping unit can be utilized to adhere a decorative wear layer, or overlay (for example a decorative paper with an electron beam cured acrylic resin) to a specific area of the extruded profile plank surface by means of heat, adhesive (for example PU hot melt solid), pressure, and cooling. Extruded planks stacked in the appropriate orientation are guided through multiple sections of a profile wrapping unit. As planks proceed through the unit specific areas of the profile are surface treated with plasma jets. At the same time the PU hot melt solid is being subjected to sufficient temperatures, such as from 250° F. to 275° F. resulting in an output of melted PU adhesive. Additionally, the overlay, which is dispensed via roll form, is fed into the wrapping unit and subjected to low levels of heat (below 120° F.). After pre-heating the overlay is then coated with roughly 9 grams/ft² of adhesive. In this case the adhesive is maintained to a temperature of 250° F. in an applicator pan and dispensed evenly with an applicator roll. The wrapping unit combines overlay, adhesive and base plank together under pressure by means of rollers. Multiple sections of rollers continue to apply pressure with rolls and mate the overlay material to the surface of the profile in a gradual progression. Additional heat is applied in two additional sections, for instance, at temperatures of 100° F. and 121° F. respectively. As the wrapped intermittent planks exit the wrapping unit, the continuous overlay material is cut by saw to the corresponding plank lengths. Wrapped planks are then stacked on pallets until staging for the next process.

A trimming process can be used and trims back any excess overlay material and completes the plank width sizing step. Wrapped planks are stacked into an automated feed unit face down. The tongue side of the plank is used as a guide as the planks proceed through the cutting tools. A total of four cutting tools (2 tools per plank side) are used to trim off excess overlay. An exposed ledge in the bevel area of the plank, which is part of the core plank profile, provides additional surface area for wrapping, and rigid support for trimming back the overlay. The trimming tools remove the overlay and the exposed ledge together, leaving a smooth vertical surface. Planks proceed through the trimming equipment to the end cut section. In this case the planks are cut to a specific length of 48" with a clean vertical cut for the end seam. As planks exit the trimming unit they are staged for packaging.

The present teachings further relate to a method of connecting the planks of the present teachings to one another. The method of connecting the planks of the present teachings can include providing a plurality of panels, wherein each panel can comprise a first side and a second side substantially parallel to the first side, and first, second, third, and fourth edges, wherein the first edge can comprise a tongue extending along the first edge and protruding from the first side of the panel, the second edge can comprise a groove extending along the second edge and defined by a first flange extending along the second edge and protruding from the first side of the panel and a second flange extending along the second edge and protruding from the second side of the panel, the third edge can comprise a shoulder, and the fourth edge can comprise a protruding lip. The method can comprise moving a first one of the panels toward a second one of the panels in a direction substantially perpendicular to the first edge of the first panel and substantially perpendicular to the second edge of the second panel, with the first and second panels being angled relative to each other with respect to their first and second sides. The tongue along the first edge of the first panel can enter the groove along the second edge of the second panel with the first and second panels in the first relative orientation wherein the respective first and second sides of the panels are angled relative to each other. After the tongue of the first panel is fully entered into the groove of the second panel, the two panels can be rotated to bring their respective first and second sides into a coplanar or flush relative orientation, thereby locking the two panels relative to each other to desirably prevent either relative horizontal or vertical motion between the two panels. A third panel can then be joined with the first and second panels by moving the third panel toward the second panel, also in a direction substantially perpendicular to the first edge of the third panel and substantially perpendicular to the second edge of the second panel, and preferably with the protruding lip (if present) along the fourth edge of the third panel entirely or substantially overlapping the shoulder (if present) along the third edge of the first panel. The overlapping arrangement of the protruding lip of the third panel and shoulder of the first panel allows the third panel to be joined with the first and second panels without having to lift or otherwise change the orientation of the first and second panels, and without requiring any relative movement between the third panel and the first and second panels after the tongue of the third panel is fully entered into the groove of the second panel and the third panel is then rotated to a position wherein the first and second sides of the third panel are coplanar or flush with the respective first and second sides of the first and second panels. Alternatively, the third panel can be joined to the second panel as described above, except the third panel can then be moved towards the first panel (e.g., by sliding) to engage the shoulder of the first panel. When no protruding lip or shoulder is present, the edges can be connected in a conventional tongue/groove manner when tongue/groove connectors are present on these edges, or connected using a spline and the like.

A bonding agent/composition can, optionally, be applied or be used to connect two or more planks together. The bonding agent can be a polyurethane bonding composition and/or epoxy bonding composition. The method can include performing hot welding and/or using ultrasonic welding techniques. Preferably, the bonding agent or composition contains a compound capable of dissolving the thermoplastic material (e.g., chemically welding the surfaces that contact each other) forming the core of the plank. These compounds can be solvents. Preferred examples of the solvents include, but are not limited to, tetrahydrafuran (THF), cyclohexanone, methylene chloride, dimethyl formamide, toluene, acetone, ethylene dichloride, methyl ethyl ketone, n-methyl pyrrolidone, methyl isobutyl ketone, dipropyl ketone, isophorone, methyl amyl ketone, nitrobenzene, methyl cyclohexanone, and acetonyl acetone. Preferably, the solvent is tetrahydrafuran or a methyl alkyl ketone or an alkyl ketone. Mixtures of two or more solvents can be used to form the bonding agent or composition. For instance, tetrahydrafuran and methyl alkyl ketone can be used as a mixture in any ratio. Preferably, the tetrahydrafuran is present in a higher amount than the methyl alkyl ketone, such as methyl ethyl ketone. Preferably, the ratio of tetrahydrafuran to methyl ethyl ketone is 9:1 to 1:1 based on a weight percentage. Other combinations of solvents can also be present in the bonding agent or composition. Depending upon the particular thermoplastic forming the core of the plank, certain solvents are more effective in increasing the bonding strength between two connected planks. For instance, when the core is made of polyvinyl chloride, tetrahydrafuran is quite effective, as well as methyl ethyl ketone and nitrobenzene. When the thermoplastic that forms the core is an acrylonitrile-butadiene-styrene polymer (ABS resin), methylene chloride, toluene, acetone, ethylene dichloride, methyl ethyl ketone, and/or tetrahydrafuran are quite effective in achieving high bonding strengths between two connected planks or tiles. It is within the bounds of the application to include mixtures of various solvents as long as the solvents do not negatively affect the ability to achieve bonding between two or more planks or tiles. The solvents are commercially available.

The solvent can be diluted with water or other media. Typically, the concentration of the solvent can be from about 80% by weight to about 100% by weight. Preferably, the concentration of the solvent is from about 90% by weight to about 100% by weight and, more preferably, the solvent is present in a concentration of from about 95% by weight to about 100% by weight and, most preferably, the solvent is present in a concentration of 100% by weight of the bonding agent.

Other ingredients can be included with the bonding agent such as fillers, silica, cyclohexanone, PVC resin, surfactants, and the like in conventional amounts.

The composition can be applied by any means known to those skilled in the art, such as with a brush, by dipping the plank in the composition, by spraying techniques, by nozzle, by use of a syringe-type device, and the like. Preferably, the composition is applied through a nozzle or with a syringe-type applicator.

The bonding composition can be applied on the shoulder, to the underside of the protruding lip, and/or at any of the connecting edges. When a bonding composition is used in the present teachings, a plank can be used, wherein the protruding lip has a length that is larger than the length of the shoulder. This design can provide a gap between the core of the first plank and the core of the adjacent plank. Thus, any excess bonding composition can accumulate in the formed gap between the cores of the two adjacent planks.

Furthermore, as discussed above, connecting the tongue and groove side edges of the planks of the present teachings to one another can involve orienting the groove in a first position to be able to receive a tongue, placing the tongue into the groove of the adjoining/adjacent plank, and then changing the orientation of the two planks to lock the tongue and the groove together. This can be accomplished by a rotational and forward movement of the planks towards one another and then straightening the planks to lock them together. Additionally, when present, the protruding lip can entirely or substantially overlap the shoulder of a similarly configured plank such that the relative rotational movement of the two planks to lock the tongue and groove together can also move the protruding lip or shoulder of one of the two planks towards the shoulder or protruding lip of a third, similarly configured plank to mate the third plank with the one of the two planks, such that the first and the second sides of the mating planks are substantially coplanar or flush with each other.

FIG. 1 illustrates an optional method to connect the planks of at least one embodiment. According to FIG. 1, planks 1 and 2 can be moved towards one another. For instance, plank 1 can be moved in the direction of arrow (a) towards plank 2, and plank 2 can, optionally, be moved towards the direction of arrow (b) towards plank 1. Preferably, when planks 1 and 2 are moved in directions (a) and (b), respectively, the edge 35 of the second side 40 mates with the edge 45 of the second side 50 so that the second sides 40 and 50 are substantially flush with each other and the protruding lip 15 covers or substantially covers the shoulder 10. According to FIG. 1, plank 3 of the present teachings is connected to planks 1 and 2 via the tongue 20 of planks 1 and 2 and the groove 5 of plank 3. Preferably, groove 5 of plank 3 is configured to receive the tongue 20 of planks 1 and 2 in a first relative orientation by rotational and forward movement of plank 3 in the direction of arrows (c) and (d), respectively. The tongue 20 of planks 1 and 2 can then be locked in place relative to the groove 5 of plank 3 in a second relative orientation. Once plank 3 is connected to planks 1 and 2, the second side 55 of plank 3 can be substantially flush with the second side surfaces 40 and 50 of planks 2 and 1, respectively. The order of connecting the planks is not important. For example, planks 1 and 3 can be connected to one another prior to connecting plank 2.

In another embodiment of the present invention, the surface covering panel or plank can incorporate the shoulder and protruding lip on opposite edges of a plank and have any connecting system on the remaining two sides of the plank, such as a conventional tongue and groove design or other mechanical lock design.

The present invention also relates to a method of joining floor panels, including providing a plurality of panels, wherein each panel comprises a first side and a second side substantially parallel to the first side, and first, second, third, and fourth edges, wherein the first edge comprises a tongue extending along the first edge and protruding from the first side of the panel, the second edge comprises a groove extending along the second edge and defined by a first flange extending along the second edge and protruding from the first side of the panel and a second flange extending along the second edge and protruding from the second side of the panel. The third edge can be a tongue or groove or straight edge or any profile for connecting one plank to another plank and the fourth edge can be a tongue or groove or straight edge or any profile for connecting one plank to another plank. The method involves moving a first one of the panels toward a second one of the panels (while one the panels is laying flat on the sub-floor or substrate) in a direction substantially perpendicular to the first edge of the first panel and substantially perpendicular to the second edge of the second panel wherein the first and second panels are angled relative to each other with respect to the first and second sides of the first and second panels until the groove of the first panel is fully engaged within the tongue of the second panel, while the second panel is laying flat on the sub-floor or substrate. The method includes rotating the first panel relative to the second panel to bring the respective first and second sides of the first and second panels into substantially coplanar or flush relationship with each other. The method can include moving a third panel toward the second panel in a direction substantially perpendicular to the first edge of the third panel and the second edge of the second panel and wherein the third and second panels are angled relative to each other with respect to the first and second sides of the third and second panels until the groove of the third panel is fully engaged within the tongue of the second panel; and rotating the third panel relative to the second panel and the first panel to lock the groove of the third panel within the tongue of the second panel, and wherein the fourth edge of the third panel is joined to or engages the third edge of the first panel by a connector or adhesive or bonding agent (e.g., a tongue into a groove or vice versa, a spline joining to a groove in each edge, an adhesive joining two edges with or without a spline, or the like) and the first, second, and third panels are substantially coplanar. The method can be changed where the tongue is inserted into the groove as well. The tongue and groove profile can have any one of the profiles described herein in the various embodiments.

With respect to the edges of the floor panels, which are joined together in some fashion, the floor panels of the present invention can have straight edges or can have a tongue and groove design or there can be some intermediate connecting system used to join the floor panels together such as a spline or other connecting device. Again, any manner in which floor panels can be joined together is embodied by the present application with respect to these two sides. For purposes of the present invention, the floor panel can have a tongue and groove design or similar connecting design on the side edges of the floor panel. Examples of floor panels that can have the connecting system(s) of the present invention include, but are not limited to, the floor panels described in U.S. Pat. Nos. 6,101,778; 6,023,907; 5,860,267; 6,006,486; 5,797,237; 5,348,778; 5,706,621; 6,094,882; 6,182,410; 6,205,639; 3,200,553; 1,764,331; 1,808,591; 2,004,193; 2,152,694; 2,852,815; 2,882,560; 3,623,288; 3,437,360; 3,731,445; 4,095,913; 4,471,012; 4,695,502; 4,807,416; 4,953,335; 5,283,102; 5,295,341; 5,437,934; 5,618,602; 5,694,730; 5,736,227; and 4,426,820 and U.S. Published Patent Application Nos. 20020031646 and 20010021431 and U.S. patent application Ser. No. 09/460,928, and all are incorporated in their entirety by reference herein.

In one embodiment, a floor panel can have at least two side edges wherein one side edge has a tongue design and the opposite side having a groove design, and wherein the tongue and groove are designed to have a mechanical locking system.

These two edges are preferably the longer of the four side edges. The remaining two edges, preferably the short joints, can have the shoulder and protruding lip design as described previously.

Thus, in at least one embodiment, the present invention encompasses any type of joint or connecting system that adjoins edges of floor panels together in some fashion with the use of straight edges, grooves, channels, tongues, splines, and other connecting systems for two edges and uses the shoulder and protruding lip on the other edges. Optionally, the planks can be joined together wherein at least a portion of the planks are joined together at least in part by an adhesive. An example of such a system is described in U.S. patent application Ser. No. 10/205,408, which is incorporated herein in its entirety.

Also, as an option in any embodiment, any edge of the plank can be straight or bevel. Preferably the edges tapered or beveled so that when two cores are brought together for attachment, a valley or V-shaped valley is formed. Preferably, the tapered or beveled edges are at an angle of from about 5° to about 55°, and, more preferably, at about a 15°-45° angle. Also, the length of the beveled or tapered edge can be from about 1.0 mm to about 7.0 mm on each core piece.

The surface-covering system of the present teachings can be used in a variety of applications including, but not limited to, wall panels, ceiling panels, flooring surfaces, decks, patios, furniture surfaces, shelves, deck panels, fascia, partition panels, horizontal surfaces, table tops, chest tops, counter tops, and other surface-coverings or parts thereof.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present teachings will be apparent to those skilled in the art from consideration of the specification and practice of the present teachings disclosed herein. It is intended that the specification and examples be considered as exemplary only, with the true scope and spirit of the present invention being indicated by the following claims and equivalents thereof.

The invention claimed is:

1. A panel comprising:
a groove extending along a first edge of said panel, wherein said groove is defined between a first flange and a second flange, wherein the first flange extending along the first edge of the panel and protruding from a first side of the panel, wherein said first flange comprising a bottom surface extending parallel to the first side, and the second flange extending along the first edge of the panel and protruding from a second side of the panel opposite to the first side;
a tongue extending along a second edge of said panel, wherein said tongue is on an opposing side of said first edge of said panel having said groove and said tongue is adapted to receive a groove of a similar panel so to mechanically lock together, wherein said tongue is configured in a S-shape, and said tongue has a lower surface extending between a bottom corner and a distal edge thereof, and a gap is defined between a back wall of the tongue and a separate side wall extending along the second edge of the panel;
a shoulder defined by a consistent depth extending along a third edge, wherein said shoulder is adapted to receive a protruding lip of a similar panel; and
a protruding lip extending along a fourth edge of said panel, wherein said protruding lip is located opposite of said edge having said shoulder,
wherein when said panel is connected with a second panel having the same groove and tongue to form a mechanical lock, (i) void volume is created above the second flange, wherein said void volume created above the second flange comprises a first void volume above the second flange and below the lower surface of the tongue and a second void volume above the second flange and in the gap, and (ii) void volume is created below said second flange when forming the mechanical lock with the second panel.

2. The panel of claim 1, wherein said shoulder includes a surface and an undercut, wherein said undercut forms an angle with respect to said surface of said shoulder, and wherein said protruding lip includes an upper surface and an uppercut, wherein said uppercut forms an angle with respect to said upper surface.

3. The panel of claim 1, wherein the first flange terminates in a distal first flange edge, and the second flange extends distally beyond the distal first flange edge and curves or angles toward a plane of the distal first flange edge, the groove being defined between the first and second flanges and opening along the groove at an angle toward a plane of the first side of the panel.

4. The panel of claim 3, wherein a distance from the panel to the distal edge of the tongue is a function of a distance from the panel to the distal first flange edge.

5. The panel of claim 4, wherein said distal edge of said tongue is offset from the first side of the panel.

6. The panel of claim 5, wherein the amount of said offset of the distal edge of the tongue from the first side of the panel is a function of the thickness of the first flange protruding from the first side of the panel.

7. The panel of claim 1, wherein said tongue protrudes from the first side of the panel.

8. The panel of claim 1, wherein said protruding lip and said shoulder have a length, wherein said length of said protruding lip is equal to or greater than said length of said shoulder when said protruding lip has a 90° edge.

9. The panel of claim 1, wherein said protruding lip has a beveled edge.

10. The panel of claim 1, wherein said first edge and said second edge are beveled.

11. The panel of claim 1, wherein said first flange and said second flange define said groove having an inner side.

12. The panel of claim 11, wherein said first flange terminates at a distal first flange edge, and said second flange extends distally beyond the distal first flange edge.

13. The panel of claim 11, wherein the second flange extends a length 2 times to 4 times longer than the first flange as measured from the inner side of the groove.

14. The panel of claim 1, wherein when said panel is connected with a second panel having the same groove and tongue to form the mechanical lock, (i) said void volume created above the second flange is at least 3.5 mm$^2$ multiplied by L, which is the length (in mm) of the tongue or groove along said panel, and (ii) said void volume created below said second flange when forming the mechanical lock with the second panel of at least 2.5 mm²X L.

15. A system comprising a plurality of panels which are connected to each other in parallel rows along an adjacent first edge and an adjacent second edge and which are in contact with each other in parallel rows along an adjacent third edge and an adjacent fourth edge, said panels comprise a first mechanism for locking together said first and second edges and a second mechanism to connect said third and fourth edges; wherein said first mechanism includes a groove extending along said first edge of said system; a tongue extending along said second edge of said system, wherein said tongue extends along an opposing edge to said first edge of said system having said groove, a shoulder extending along said third edge of said system, wherein said shoulder is adapted to receive a protruding lip of said system, wherein said protruding lip of said system extends along said fourth edge of said system; and wherein said groove is defined between a first flange extending along the first edge of the system and protruding from a first side of the system, and a second flange extending along the first edge of the system and protruding from a second side of the system opposite to the first side, wherein the first flange terminates in a distal first flange edge and comprises a bottom surface extending parallel to the first side, and the second flange extends distally beyond the distal first flange edge and curves or angles in a direction toward a horizontal plane of the first side, wherein the groove being defined between the first and second flanges and a groove opening at an angle toward the horizontal plane of the first side of the system, wherein said tongue is configured in an S-shape and has a distal edge and a lower surface extending between a bottom corner and the distal edge thereof, and a gap is defined between a back wall of the tongue and a separate side wall extending along the second edge of the panel, and wherein said tongue has an overall height as measured from the bottom surface of said tongue to the top surface of said system, and wherein the overall height of said tongue is at least 50% of the overall height of said system, and wherein when said panel is connected with a second panel having the same groove and tongue to form a mechanical lock, (i) void volume is created above the second flange, wherein said void volume created above the second flange comprises a first void volume above the second flange and below the lower surface of the tongue and a second void volume above the second flange and in the gap, and (ii) void volume is created below said second flange when forming the mechanical lock with the second panel.

16. The system of claim 15, wherein when said panel is connected with a second panel having the same groove and tongue to form the mechanical lock, (i) said void volume created above the second flange is at least 3.5 mm² multiplied by L, which is the length (in mm) of the tongue or groove along said panel, and (ii) said void volume created below said second flange when forming the mechanical lock with the second panel is at least 2.5 mm²X L.

17. A method of joining floor panels, comprising:
providing a plurality of panels, wherein each panel comprises a first side and a second side substantially parallel to the first side, and first, second, third, and fourth edges, wherein the first edge comprises a tongue extending along the first edge and protruding from the first side of the panel, the second edge comprises a groove extending along the second edge and defined by a first flange extending along the second edge and protruding from the first side of the panel and a second flange extending along the second edge and protruding from the second side of the panel, the third edge comprises a shoulder, and the fourth edge comprises a protruding lip, wherein the first flange terminates in a distal first flange edge and comprises a bottom surface extending parallel to the first side, and the second flange extends distally beyond the distal first flange edge and curves or angles in a direction toward a horizontal plane of the first side, the groove being defined between the first and second flanges and opening along the groove at an angle toward the horizontal plane of the first side of the panel, and wherein said tongue is configured in an S-shape and has a distal edge and a lower surface extending between a bottom corner and the distal edge thereof, and a gap is defined between a back wall of the tongue and a separate side wall extending along the second edge of the panel, wherein said tongue has an overall height as measured from the bottom surface of said tongue to the top surface of said panel wherein the overall height of said tongue is at least 50% of the overall height of said panel, and wherein when said panel is connected with a second panel having the same groove and tongue to form a mechanical lock, (i) void volume is created above the second flange, wherein said void volume created above the second flange comprises a first void volume above the second flange and below the lower surface of the tongue and a second void volume above the second flange and in the gap, and (ii) void volume is created below said second flange when forming the mechanical lock with the second panel;

moving a first one of the panels toward a second one of the panels in a direction substantially perpendicular to the first edge of the first panel and substantially perpendicular to the second edge of the second panel wherein the first and second panels are angled relative to each other with respect to the first and second sides of the first and second panels until the tongue of the first panel is fully engaged within the groove of the second panel;

rotating the first and second panels relative to each other to bring the respective first and second sides of the first and second panels into substantially coplanar or flush relationship with each other;

moving a third panel toward the second panel in a direction substantially perpendicular to the first edge of the third panel and the second edge of the second panel and wherein the third and second panels are angled relative to each other with respect to the first and second sides of the third and second panels until the tongue of the third panel is fully engaged within the groove of the second panel and the protruding lip along the fourth edge of the third panel entirely or substantially overlaps the shoulder along the third edge of the first panel; and rotating the third panel relative to the second panel and the first panel to lock the tongue of the third panel within the groove of the second panel, and wherein the protruding lip of the third panel engages with the shoulder of the first panel and the first, second, and third panels are substantially coplanar.

18. The method of claim 17, wherein the third panel is rotated relative to the second panel and the first panel to lock the tongue of the third panel in the groove of the second panel and the second and first panels are held stationary.

19. The method of claim 17, wherein when said panel is connected with a second panel having the same groove and tongue to form the mechanical lock, (i) said void volume created above the second flange is at least 3.5 mm² multiplied by L, which is the length (in mm) of the tongue or groove along said panel, and (ii) said void volume created below said second flange when forming the mechanical lock with the second panel is at least 2.5 mm²X L.

20. A method of joining floor panels, comprising:
providing a plurality of panels, wherein each panel comprises a first side and a second side substantially parallel to the first side, and first, second, third, and fourth edges, wherein the first edge comprises a tongue extending along the first edge and protruding from the first side of the panel, the second edge comprises a groove extending along the second edge and defined by a first flange extending along the second edge and protruding from the first side of the panel and a second flange extending along the second edge and protruding from the second side of the panel, the third edge comprises a shoulder, and the fourth edge comprises a protruding lip, wherein the first flange terminates in a distal first flange edge and comprises a bottom surface extending parallel to the first side, and the second flange extends distally beyond the distal first flange edge and curves or angles in a direction toward a horizontal plane of the first side, the groove being defined between the first and second flanges and opening along the groove at an angle toward the horizontal plane of the first side of the panel, and wherein said tongue is configured in an S-shape and has a distal edge and a lower surface extending between a bottom corner and the distal edge thereof, and a gap is defined between a back wall of the tongue and a separate side wall extending along the second edge of the panel, wherein said tongue has an overall height as measured from the bottom surface of said tongue to the top surface of said panel wherein the overall height of said tongue is at least 50% of the overall height of said panel, and wherein when said panel is connected with a second panel having the same groove and tongue to form a mechanical lock, (i) void volume is created above the second flange, wherein said void volume created above the second flange comprises a first void volume above the second flange and below the lower surface of the tongue and a second void volume above the second flange and in the gap, and (ii) void volume is created below said second flange when forming the mechanical lock with the second panel;
moving a first one of the panels toward a second one of the panels in a direction substantially parallel to the first edge of the first panel and substantially parallel to the first edge of the second panel wherein the respective first and second sides of the first and second panels are substantially coplanar with each other until the protruding lip along the fourth edge of the first panel entirely or substantially overlaps the shoulder along the third edge of the second panel;
moving the first and second panels together toward a third panel in a direction substantially perpendicular to the first edge of the first and second panels and substantially perpendicular to the second edge of the third panel, and wherein the first and second panels are angled relative to the third panel with respect to the first and second sides of the first, second, and third panels until the tongue along the first edge of the first and second panels is fully engaged within the groove along the second edge of the third panel; and
rotating the first and second panels relative to the third panel to lock the tongue along the first edge of the first and second panels within the groove along the second edge of the third panel and to bring the respective first and second sides of the first, second, and third panels into substantially coplanar or flush relationship with each other.

21. The method of claim 20, wherein when said panel is connected with a second panel having the same groove and tongue to form the mechanical lock, (i) said void volume created above the second flange is at least 3.5 mm² multiplied by L, which is the length (in mm) of the tongue or groove along said panel, and (ii) said void volume created below said second flange when forming the mechanical lock with the second panel is at least 2.5 mm²X L.

22. A panel comprising:
a groove extending along a first edge of said panel, wherein said panel has a top surface;
a tongue extending along a second edge of said panel, wherein said tongue is on an opposing side of said first edge of said panel having said groove;
wherein said groove is defined between a first flange extending along the first edge of the panel and protruding from a first side of the panel, and a second flange extending along the first edge of the panel and protruding from a second side of the panel opposite to the first side,
wherein the first flange terminates in a distal first flange edge and comprises a bottom surface extending parallel to the first side, and the second flange extends distally beyond the distal first flange edge and curves or angles in a direction toward a horizontal plane of the first side, the groove being defined between the first and second flanges and opening along the groove at an angle toward the horizontal plane of the first side of the panel,
wherein said tongue is configured in an S-shape and has a distal edge and a lower surface extending between a bottom corner and the distal edge thereof, and a gap is defined between a back wall of the tongue and a separate side wall extending along the second edge of the panel wherein the second flange is contactable with said back wall or said separate side wall, wherein said tongue has an overall height as measured from the bottom surface of said tongue to the top surface of said panel, and wherein the overall height of said tongue is at least 50% of the overall height of said panel, and a distance from the panel to the distal edge of the tongue is a function of a distance from the panel to the distal first flange edge, and
wherein when said panel is connected with a second panel having the same groove and tongue to form a mechanical lock, (i) void volume is created above the second flange, wherein said void volume created above the second flange comprises a first void volume above the second flange and below the lower surface of the tongue and a second void volume above the second flange and in the gap, and (ii) void volume is created below said second flange when forming the mechanical lock with the second panel.

23. The panel of claim 22, wherein when said panel is connected with a second panel having the same groove and tongue to form the mechanical lock, (i) said void volume created above the second flange is at least 3.5 mm² multiplied by L, which is the length (in mm) of the tongue or groove along said panel, and (ii) said void volume created below said second flange when forming the mechanical lock with the second panel is at least 2.5 mm²X L.

24. A panel comprising:
a groove extending along a first edge of said panel, wherein said panel has a top surface;

a tongue extending along a second edge of said panel, wherein said tongue is on an opposing side of said first edge of said panel having said groove;

wherein said groove is defined between a first flange extending along the first edge of the panel and protruding from a first side of the panel, and a second flange extending along the first edge of the panel and protruding from a second side of the panel opposite to the first side, wherein the first flange terminates in a distal first flange edge and comprises a bottom surface extending parallel to the first side, and the second flange extends distally beyond the distal first flange edge and curves or angles in a direction toward a horizontal plane of the first side, the groove being defined between the first and second flanges and opening along the groove at an angle toward the horizontal plane of the first side of the panel, wherein said tongue is configured in an S-shape and has a distal edge and a lower surface extending between a bottom corner and the distal edge thereof, and a gap is defined between a back wall of the tongue and a separate side wall extending along the second edge of the panel, and wherein said tongue has an overall height as measured from the bottom surface of said tongue to the top surface of said panel, and wherein the overall height of said tongue is at least 50% of the overall height of said panel, and wherein when said panel is connected with a second panel having the same groove and tongue to form a mechanical lock, (i) void volume is created above the second flange, wherein said void volume created above the second flange comprises a first void volume above the second flange and below the lower surface of the tongue and a second void volume above the second flange and in the gap, and (ii) void volume is created below said second flange when forming the mechanical lock with the second panel.

25. The panel of claim 24, wherein said overall height of said tongue is at least 60% of the overall height of said panel.

26. The panel of claim 24, wherein said overall height of said tongue is at least 65% of the overall height of said panel.

27. The panel of claim 24, wherein said overall height of said tongue is from about 60% to about 70% of the overall height of said panel.

28. The panel of claim 24, wherein said overall height of said tongue is from about 65% to about 80% of the overall height of said panel.

29. The panel of claim 24, wherein when said panel is connected with a second panel having the same groove and tongue to form the mechanical lock, (i) said void volume created above the second flange is at least 3.5 mm$^2$ multiplied by L, which is the length (in mm) of the tongue or groove along said panel, and (ii) said void volume created below said second flange when forming the mechanical lock with the second panel is at least 2.5 mm$^2$X L.

30. A panel comprising:

a groove extending along a first edge of said panel;

a tongue extending along a second edge of said panel and a gap is defined between a back wall and a separate side wall extending along the second edge of said panel, wherein said tongue is configured in an S-shape and has a distal edge and a lower surface extending between a bottom corner and the distal edge thereof, and wherein said tongue is on an opposing side of said first edge of said panel having said groove;

wherein said groove is defined between a first flange extending along the first edge of the panel and protruding from a first side of the panel, and a second flange extending along the first edge of the panel and protruding from a second side of the panel opposite to the first side, wherein the first flange terminates in a distal first flange edge and comprises a bottom surface extending parallel to the first side, and the second flange extends distally beyond the distal first flange edge and curves or angles in a direction toward the horizontal plane of the first side, the groove being defined between the first and second flanges and opening along the groove at an angle toward a horizontal plane of the first side of the panel, wherein said panel has a top surface and a bottom surface, wherein said first side of said panel is the top surface and said second side of said panel is the bottom surface, wherein said second flange has a highest point and has a height as measured from the bottom surface of said panel to said highest point in said second flange, and wherein said panel has an overall height, and wherein said height of said second flange is about 55% to about 75% of the overall height of said panel, and wherein when said panel is connected with a second panel having the same groove and tongue to form a mechanical lock, (i) void volume is created above the second flange, wherein said void volume created above the second flange comprises a first void volume above the second flange and below the lower surface of the tongue and a second void volume above the second flange and in the gap, and (ii) void volume is created below said second flange when forming the mechanical lock with the second panel.

31. The panel of claim 30, wherein said height of said second flange is from about 60% to about 75% of the overall height of said panel.

32. The panel of claim 30, wherein when said panel is connected with a second panel having the same groove and tongue to form the mechanical lock, (i) said void volume created above the second flange is at least 3.5 mm$^2$ multiplied by L, which is the length (in mm) of the tongue or groove along said panel, and (ii) said void volume created below said second flange when forming the mechanical lock with the second panel is at least 2.5 mm$^2$X L.

33. A panel comprising:

a groove extending along a first edge of said panel;

a tongue extending along a second edge of said panel and a gap is defined between a back wall and a separate side wall extending along the second edge of said panel, wherein said tongue is configured in an S-shape and has a distal edge and a lower surface extending between a bottom corner and the distal edge thereof, wherein said tongue is on an opposing side of said first edge of said panel having said groove;

wherein said groove is defined between a first flange extending along the first edge of the panel and protruding from a first side of the panel, and a second flange extending along the first edge of the panel and protruding from a second side of the panel opposite to the first side, wherein the first flange terminates in a distal first flange edge, and the second flange extends distally beyond the distal first flange edge and curves or angles in a direction toward a horizontal plane of the first side, the groove being defined between the first and second flanges and opening along the groove at an angle toward the first side of the panel, wherein said panel has a top surface and a bottom surface, wherein said first side of said panel is the top surface and said second side of said panel is the bottom surface, wherein said second flange has a highest point and has a height as measured from the bottom surface of said panel to the highest point in said second flange, and wherein said first flange has a bottom surface extending parallel to the first side, which has a height measured from the bottom surface of said panel to the bottom surface of said first flange, and wherein the height of the second flange is greater than the height of said bottom surface of said first flange, and;

wherein when said panel is connected with a second panel having the same groove and tongue to form a mechanical lock, (i) void volume is created above the second flange, wherein said void volume created above the second flange comprises a first void volume above the second flange and below the lower surface of the tongue and a second void volume above the second flange and in the gap, and (ii) void volume is created below said second flange when forming the mechanical lock with the second panel.

34. The panel of claim 33, wherein the height of the second flange is at least 5% greater than the height of said bottom surface of said first flange.

35. The panel of claim 34, wherein the height of the second flange is at least 15% greater than the height of said bottom surface of said first flange.

36. The panel of claim 35, wherein the height of the second flange is at least from about 5% to 15% greater than the height of said bottom surface of said first flange.

37. The panel of claim 33, wherein when said panel is connected with a second panel having the same groove and tongue to form the mechanical lock, (i) said void volume created above the second flange is at least 3.5 mm² multiplied by L, which is the length (in mm) of the tongue or groove along said panel, and (ii) said void volume created below said second flange when forming the mechanical lock with the second panel is at least 2.5 mm²X L.

38. A panel comprising:
a groove extending along a first edge of said panel;
a tongue extending along a second edge of said panel, wherein said tongue is on an opposing side of said first edge of said panel having said groove;
wherein said groove is defined between a first flange extending along the first edge of the panel and protruding from a first side of the panel, and a second flange extending along the first edge of the panel and protruding from a second side of the panel opposite to the first side,
wherein the first flange terminates in a distal first flange edge and comprises a bottom surface extending parallel to the first side, and the second flange extends distally beyond the distal first flange edge and curves or angles in a direction toward a horizontal plane of the first side, the groove being defined between the first and second flanges and a groove opening at an angle toward the horizontal plane of the first side of the panel,
wherein said tongue is configured in an S-shape and has a distal edge and a lower surface extending between a bottom corner and the distal edge thereof, and a gap is defined between a back wall of the tongue and a separate side wall extending along the second edge of the panel, and wherein said groove has an outlined groove profile shape and wherein said S-shape of said tongue and said outlined groove profile shape are not identical or substantially identical to each other, and a distance from the panel to the distal edge of the tongue is a function of a distance from the panel to the distal first flange edge, wherein said panel has a top surface and a bottom surface, wherein said first side of said panel is the top surface and said second side of said panel is the bottom surface, wherein said second flange has a highest point and has a height as measured from the bottom surface of said panel to said highest point in said second flange, and wherein said panel has an overall height, and wherein said height of said second flange is about 55% to about 75% of the overall height of said panel, and wherein when said panel is connected with a second panel having the same groove and tongue to form a mechanical lock, (i) void volume is created above the second flange, wherein said void volume created above the second flange comprises a first void volume above the second flange and below the lower surface of the tongue and a second void volume above the second flange and in the gap, and (ii) void volume is created below said second flange when forming the mechanical lock with the second panel.

39. The panel of claim 38, wherein when said panel is connected with a second panel having the same groove and tongue to form the mechanical lock, (i) said void volume created above the second flange is at least 3.5 mm² multiplied by L, which is the length (in mm) of the tongue or groove along said panel, and (ii) said void volume created below said second flange when forming the mechanical lock with the second panel is at least 2.5 mm²X L.

40. A panel comprising:
a groove extending along a first edge of said panel;
a tongue extending along a second edge of said panel, wherein said tongue is on an opposing side of said first edge of said panel having said groove;
wherein said groove is defined between a first flange extending along the first edge of the panel and protruding from a first side of the panel, and a second flange extending along the first edge of the panel and protruding from a second side of the panel opposite to the first side,
wherein the first flange terminates in a distal first flange edge and comprises a bottom surface extending parallel to the first side, and the second flange extends distally beyond the distal first flange edge and curves or angles in a direction toward a horizontal plane of the first side, the groove being defined between the first and second flanges and opening along the groove at an angle toward the horizontal plane of the first side of the panel,
wherein said tongue is configured in an S-shape and has a distal edge and a lower surface extending between a bottom corner and the distal edge thereof, and a gap is defined between a back wall of the tongue and a separate side wall extending along the second edge of the panel, and a distance from the panel to the distal edge of the tongue is a function of a distance from the panel to the distal first flange edge,
wherein said panel has a top surface and a bottom surface and said tongue is shaped such that a gap is defined between a back wall and a separate side wall extending along the second edge wherein the second flange is contactable with said back wall or said separate side wall, wherein said gap has an upper surface, and wherein said gap has a gap height as measured from the bottom surface of said tongue to the upper surface of said gap and said panel has a panel height measured from said bottom surface of said panel to said upper surface of said gap, wherein said gap height is at least 10% of said panel height, wherein said first side of said panel is the top surface and said second side of said panel is the bottom surface, wherein said second flange has a highest point and has a height as measured from the bottom surface of said panel to said highest point in said second flange, and wherein said panel has an overall height, and wherein said height of said second flange is about 55% to about 75% of the overall height of said panel, and wherein when said panel is connected with a second panel having the same groove and tongue to form a mechanical lock, (i) void volume is created above the second flange, wherein said void volume created above the second flange comprises a first void volume above the second flange and below the lower surface of the tongue and a second void volume above the second flange and in the gap, and (ii) void volume is created below said second flange when forming the mechanical lock with the second panel.

41. The panel of claim 40, wherein said gap height is at least 20% of said panel height.

42. The panel of claim 40, wherein said gap height is at least 30% of said panel height.

43. The panel of claim 40, wherein said gap height is at least 50% of said panel height.

44. The panel of claim 40, wherein said gap height is from about 20% to about 70% of said panel height.

45. The panel of claim 40, wherein when said panel is connected with a second panel having the same groove and tongue to form the mechanical lock, (i) said void volume created above the second flange is at least 3.5 mm$^2$ multiplied by L, which is the length (in mm) of the tongue or groove along said panel, and (ii) said void volume created below said second flange when forming the mechanical lock with the second panel is at least 2.5 mm$^2$X L.

46. A panel comprising:
a groove extending along a first edge of said panel;
a tongue extending along a second edge of said panel and a gap is defined between a back wall and a separate side wall extending along the second edge of said panel, wherein said tongue is configured in an S-shape and has a distal edge and a lower surface extending between a bottom corner and the distal edge thereof, wherein said tongue is on an opposing side of said first edge of said panel having said groove;
wherein said groove is defined between a first flange extending along the first edge of the panel and protruding from a first side of the panel, and a second flange extending along the first edge of the panel and protruding from a second side of the panel opposite to the first side,
wherein the first flange terminates in a distal first flange edge and comprises a bottom surface extending parallel to the first side, and the second flange extends distally beyond the distal first flange edge and curves or angles in a direction toward a horizontal plane of the first side, the groove being defined between the first and second flanges and opening along the groove at an angle toward the horizontal plane of the first side of the panel,
wherein said second flange has an outer angle and an inner angle that defines an angled portion of said second flange, wherein said outer angle is from about 40° to about 80° as measured from the horizontal plane of the bottom surface of the panel to the angled portion of said second flange, and
wherein when said panel is connected with a second panel having the same groove and tongue to form a mechanical lock, (i) void volume is created above the second flange, wherein said void volume created above the second flange comprises a first void volume above the second flange and below the lower surface of the tongue and a second void volume above the second flange and in the gap, and (ii) void volume is created below said second flange when forming the mechanical lock with the second panel.

47. The panel of claim 46, wherein said outer angle is from about 55° to about 75°.

48. The panel of claim 46, wherein said panel comprises a core, wherein said core is a thermoplastic core.

49. The panel of claim 46, wherein when said panel is connected with a second panel having the same groove and tongue to form the mechanical lock, (i) said void volume created above the second flange is at least 3.5 mm$^2$ multiplied by L, which is the length (in mm) of the tongue or groove along said panel, and (ii) said void volume created below said second flange when forming the mechanical lock with the second panel is at least 2.5 mm$^2$X L.

50. A first panel comprising:
a groove extending along a first edge of said first panel;
a tongue extending along a second edge of said first panel, wherein said tongue is on an opposing side of said first edge of said first panel having said groove;
wherein said groove is defined between a first flange extending along the first edge of the panel and protruding from a first side of the panel, and a second flange extending along the first edge of the panel and protruding from a second side of the panel opposite to the first side,
wherein the first flange terminates in a distal first flange edge and comprises a bottom surface extending parallel to the first side, and the second flange extends distally beyond the distal first flange edge and curves or angles in a direction toward a horizontal plane of the first side, the groove being defined between the first and second flanges and opening along the groove at an angle toward the horizontal plane of the first side of the panel,
wherein said tongue has a distal edge and a lower surface extending between a bottom corner and the distal edge thereof, and a gap is defined between a back wall of the tongue and a separate side wall extending along the second edge of the panel,
wherein said groove has a groove profile and said tongue has a tongue profile configured in said S-shape such that said tongue and said groove are capable of connecting with a second panel having said groove profile and said tongue profile, wherein said groove of said first panel is insertable into said tongue of said second panel while said second panel is lying flat on a surface to form a mechanical lock, and said tongue of said first panel is insertable into said groove of said second panel while said second panel is lying flat on a surface to form a mechanical lock, and
wherein when said panel is connected with a second panel having the same groove and tongue to form a mechanical lock, (i) void volume is created above the second flange, wherein said void volume created above the second flange comprises a first void volume above the second flange and below the lower surface of the tongue and a second void volume above the second flange and in the gap, and (ii) void volume is created below said second flange when forming the mechanical lock with the second panel.

51. The first panel of claim 50, wherein when said panel is connected with a second panel having the same groove and tongue to form the mechanical lock, (i) said void volume created above the second flange is at least 3.5 mm² multiplied by L, which is the length (in mm) of the tongue or groove along said panel, and (ii) said void volume created below said second flange when forming the mechanical lock with the second panel is at least 2.5 mm²X L.

52. A panel comprising:
a groove extending along a first edge of said panel;
a tongue extending along a second edge of said panel, wherein said tongue is on an opposing side of said first edge of said panel having said groove;
wherein said groove is defined between a first flange and a second flange, wherein the first flange extending along the first edge of the panel and protruding from a first side of the panel, and the second flange extending along the first edge of the panel and protruding from a second side of the panel opposite to the first side;
wherein the first flange terminates in a distal first flange edge and comprises a bottom surface extending parallel to the first side, and the second flange extends distally beyond the distal first flange edge and curves or angles in a direction toward a horizontal plane of the first side, the groove being defined between the first and second flanges and opening along the groove at an angle toward the horizontal plane of the first side of the panel,
wherein said tongue is configured in a S-shape, and said tongue has a lower surface extending between a bottom corner and a distal edge thereof, and a gap is defined between a back wall of the tongue and a separate side wall extending along the second edge of the panel,
wherein when said panel is connected with a second panel having the same groove and tongue to form a mechanical lock, (i) void volume created above the second flange is at least 3.5 mm² multiplied by L, which is the length (in mm) of the tongue or groove along said panel wherein said void volume created above the second flange comprises a first void volume above the second flange and below the lower surface of the tongue and a second void volume above the second flange and in the gam and (ii) void volume created below said second flange when forming a mechanical lock with the second panel of at least 2.5 mm²X L.

53. The panel of claim 52, wherein said void volume created above the second flange is from about 3.8 mm²X L to about 6.5 mm²X L.

54. The panel of claim 52, wherein said void volume created below said second flange when forming a mechanical lock with said second panel of is at least 5 mm²X L.

55. The panel of claim 52, wherein said void volume created below said second flange when forming a mechanical lock with said second panel of is from about 6 mm²X L to about 10 mm²X L.

56. A method of joining floor panels, comprising:
providing a plurality of panels, wherein each panel comprises a first side and a second side substantially parallel to the first side, and first, second, third, and fourth edges, wherein the first edge comprises a tongue extending along the first edge and protruding from the first side of the panel, the second edge comprises a groove extending along the second edge and defined by a first flange extending along the second edge and protruding from the first side of the panel and a second flange extending along the second edge and protruding from the second side of the panel, the third edge comprises a profile that is joinable with the fourth edge that comprises a profile joinable with the third edge, and further wherein the first flange terminates in a distal first flange edge and comprises a bottom surface extending parallel to the first side, and the second flange extends distally beyond the distal first flange edge and curves or angles in a direction toward a horizontal plane of the first side, the groove being defined between the first and second flanges and opening along the groove at an angle toward the horizontal plane of the first side of the panel, and wherein said tongue is configured in an S-shape and has a distal edge and a lower surface extending between a bottom corner and the distal edge thereof, and a gap is defined between a back wall of the tongue and a separate side wall extending along the second edge of the panel, wherein when said panel is connected with a second panel having the same groove and tongue to form a mechanical lock, (i) void volume is created above the second flange, wherein said void volume created above the second flange comprises a first void volume above the second flange and below the lower surface of the tongue and a second void volume above the second flange and in the gap, and (ii) void volume is created below said second flange when forming the mechanical lock with the second panel;
moving a first one of the panels toward a second one of the panels in a direction substantially perpendicular to the first edge of the first panel and substantially perpendicular to the second edge of the second panel wherein the first and second panels are angled relative to each other with respect to the first and second sides of the first and second panels until the groove of the first panel is fully engaged within the tongue of the second panel while the second panel is laying flat;
rotating the first panel relative to the second panel to bring the respective first and second sides of the first and second panels into substantially coplanar or flush relationship with each other;
moving a third panel toward the second panel in a direction substantially perpendicular to the first edge of the third panel and the second edge of the second panel and wherein the third and second panels are angled relative to each other with respect to the first and second sides of the third and second panels until the groove of the third panel is fully engaged within the tongue of the second panel; and
rotating the third panel relative to the second panel and the first panel to lock the groove of the third panel within the tongue of the second panel, and wherein the third edge of the third panel engages or joins with the fourth edge of the first panel, such that the first, second, and third panels are joined together and are substantially coplanar.

57. The method of claim 56, wherein when said panel is connected with a second panel having the same groove and tongue to form the mechanical lock, (i) said void volume created above the second flange is at least 3.5 mm² multiplied by L, which is the length (in mm) of the tongue or groove along said panel, and (ii) said void volume created below said second flange when forming the mechanical lock with the second panel is at least 2.5 mm²X L.

* * * * *

UNITED STATES PATENT AND TRADEMARK OFFICE
CERTIFICATE OF CORRECTION

PATENT NO. : 7,849,655 B2  
APPLICATION NO. : 11/190452  
DATED : December 14, 2010  
INVENTOR(S) : Chen et al.

Page 1 of 1

It is certified that error appears in the above-identified patent and that said Letters Patent is hereby corrected as shown below:

IN THE CLAIMS:

Claim 4, column 26, line 35, "to the distal" should read --to a distal--.

Claim 52, column 37, line 38, "the gam" should read --the gap,--.

Signed and Sealed this  
Eighth Day of February, 2011

David J. Kappos  
*Director of the United States Patent and Trademark Office*